(12) United States Patent
Betz et al.

(10) Patent No.: US 11,795,043 B2
(45) Date of Patent: *Oct. 24, 2023

(54) MID-MOUNT FIRE APPARATUS

(71) Applicant: Oshkosh Corporation, Oshkosh, WI (US)

(72) Inventors: Eric D. Betz, Clintonville, WI (US); David W. Archer, Hortonville, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/721,002

(22) Filed: Apr. 14, 2022

(65) Prior Publication Data
US 2022/0242713 A1 Aug. 4, 2022

Related U.S. Application Data

(63) Continuation of application No. 16/599,672, filed on Oct. 11, 2019, now Pat. No. 11,332,353, which is a continuation of application No. 16/389,072, filed on Apr. 19, 2019, now Pat. No. 10,442,668.

(60) Provisional application No. 62/661,330, filed on Apr. 23, 2018.

(51) Int. Cl.
| | |
|---|---|
| *B66F 11/04* | (2006.01) |
| *A62C 27/00* | (2006.01) |
| *B60R 9/02* | (2006.01) |
| *E06C 5/04* | (2006.01) |
| *A62C 37/00* | (2006.01) |

(52) U.S. Cl.
CPC ............ *B66F 11/046* (2013.01); *A62C 27/00* (2013.01); *A62C 37/00* (2013.01); *B60R 9/02* (2013.01); *E06C 5/04* (2013.01)

(58) Field of Classification Search
CPC ....... A62C 27/00; A62C 37/00; B66F 11/046; B60R 9/02; E06C 5/04; E06C 5/06; E06C 5/08; E06C 5/10; E06C 5/12; E06C 5/14; E06C 5/16; E06C 5/18
See application file for complete search history.

(56) References Cited

U.S. PATENT DOCUMENTS

| | | |
|---|---|---|
| 5,538,274 A | 7/1996 | Schmitz et al. |
| 5,788,158 A | 8/1998 | Relyea |
| 5,820,150 A | 10/1998 | Archer et al. |
| 5,839,664 A | 11/1998 | Relyea |
| 5,897,123 A | 4/1999 | Cherney et al. |
| 6,561,718 B1 | 5/2003 | Archer et al. |
| 6,755,258 B1 | 6/2004 | Hunke et al. |
| 6,811,161 B1 | 11/2004 | Anderson |
| 6,860,332 B1 | 3/2005 | Archer et al. |
| 7,178,631 B2 | 2/2007 | Salmi et al. |

(Continued)

*Primary Examiner* — Darren W Gorman
(74) *Attorney, Agent, or Firm* — Foley & Lardner LLP

(57) ABSTRACT

A mid-mount fire apparatus includes a chassis, a body assembly coupled to the chassis, a front cabin coupled to the chassis forward of the body assembly, a front axle coupled to the chassis, a tandem rear axle coupled to the chassis, and a ladder assembly having a proximal end that is coupled to the chassis rearward of the front cabin and between the front axle and the tandem rear axle. The ladder assembly includes a plurality of ladder sections. The ladder assembly is extensible to a horizontal reach of at least 88 feet. A distal end of the ladder assembly does not extend beyond the rear end of the body assembly when fully retracted.

20 Claims, 20 Drawing Sheets

(56) References Cited

U.S. PATENT DOCUMENTS

| | | |
|---|---|---|
| 9,302,129 B1 | 4/2016 | Betz et al. |
| 9,492,695 B2 | 11/2016 | Betz et al. |
| 2003/0230412 A1 | 12/2003 | Archer |
| 2003/0230863 A1 | 12/2003 | Archer |
| 2004/0039510 A1 | 2/2004 | Archer et al. |
| 2005/0001400 A1 | 1/2005 | Archer et al. |
| 2005/0236226 A1 | 10/2005 | Salmi et al. |
| 2006/0037760 A1 | 2/2006 | Froland et al. |
| 2006/0065411 A1 | 3/2006 | Linsmeier et al. |
| 2006/0180322 A1 | 8/2006 | Archer et al. |
| 2007/0034389 A1 | 2/2007 | Relyea et al. |
| 2007/0187434 A1 | 8/2007 | Schrafel |
| 2007/0284156 A1 | 12/2007 | Grady et al. |
| 2008/0060822 A1 | 3/2008 | Salmi et al. |
| 2008/0099212 A1 | 5/2008 | Do |
| 2008/0099213 A1 | 5/2008 | Morrow et al. |
| 2008/0197094 A1 | 8/2008 | Bond |
| 2009/0256386 A1 | 10/2009 | Wood |
| 2010/0140016 A1 | 6/2010 | Raappana |
| 2010/0289238 A1 | 11/2010 | Archer et al. |
| 2012/0193109 A1 | 8/2012 | Moore et al. |
| 2014/0238704 A1 | 8/2014 | Moore et al. |
| 2014/0246265 A1 | 9/2014 | Archer et al. |
| 2014/0262355 A1 | 9/2014 | Linsmeier |
| 2014/0334169 A1 | 11/2014 | Ewert |
| 2016/0144209 A1 | 5/2016 | Moore |
| 2016/0144210 A1 | 5/2016 | Betz et al. |
| 2016/0144211 A1 | 5/2016 | Betz et al. |
| 2016/0145940 A1 | 5/2016 | Aiken et al. |
| 2016/0145941 A1 | 5/2016 | Betz et al. |
| 2016/0215560 A1 | 7/2016 | Aiken et al. |
| 2016/0304051 A1 | 10/2016 | Archer et al. |
| 2017/0050063 A1 | 2/2017 | Shively et al. |
| 2017/0056695 A1 | 3/2017 | Moore |
| 2017/0121108 A1 | 5/2017 | Davis et al. |
| 2017/0182340 A1 | 6/2017 | Moore |
| 2017/0225888 A1 | 8/2017 | Betz et al. |
| 2018/0064973 A1 | 3/2018 | Moore |
| 2018/0215354 A1 | 8/2018 | Linsmeier et al. |
| 2018/0215597 A1 | 8/2018 | Linsmeier et al. |
| 2018/0221694 A1 | 8/2018 | Shively et al. |
| 2018/0265289 A1 | 9/2018 | Davis et al. |
| 2018/0297597 A1 | 10/2018 | Linsmeier et al. |
| 2019/0015692 A1 | 1/2019 | Fieber et al. |
| 2019/0106083 A1 | 4/2019 | Archer et al. |
| 2019/0161272 A1 | 5/2019 | Betz et al. |
| 2019/0209881 A1 | 7/2019 | Wroblewski et al. |

MID-MOUNT FIRE APPARATUS

CROSS-REFERENCE TO RELATED PATENT APPLICATIONS

This application (a) is a continuation of U.S. patent application Ser. No. 16/599,672, filed Oct. 11, 2019, which is a continuation of U.S. patent application Ser. No. 16/389,072, filed Apr. 19, 2019, which claims the benefit of U.S. Provisional Patent Application No. 62/661,330, filed Apr. 23, 2018, and (b) is related to (i) U.S. patent application Ser. No. 16/389,630, filed Apr. 19, 2019, which claims the benefit of U.S. Provisional Patent Application No. 62/661,382, filed Apr. 23, 2018, (ii) U.S. patent application Ser. No. 16/389,653, filed Apr. 19, 2019, which claims the benefit of U.S. Provisional Patent Application No. 62/661,420, filed Apr. 23, 2018, (iii) U.S. patent application Ser. No. 16/389,570, filed Apr. 19, 2019, which claims the benefit of U.S. Provisional Patent Application No. 62/661,384, filed Apr. 23, 2018, (iv) U.S. patent application Ser. No. 16/389,600, filed Apr. 19, 2019, which claims the benefit of U.S. Provisional Patent Application No. 62/661,414, filed Apr. 23, 2018, (v) U.S. patent application Ser. No. 16/389,143, filed Apr. 19, 2019, which claims the benefit of U.S. Provisional Patent Application No. 62/661,419, filed Apr. 23, 2018, (vi) U.S. patent application Ser. No. 16/389,176, filed Apr. 19, 2019, which claims the benefit of U.S. Provisional Patent Application No. 62/661,426, filed Apr. 23, 2018, and (vii) U.S. patent application Ser. No. 16/389,029, filed Apr. 19, 2019, which claims the benefit of U.S. Provisional Patent Application No. 62/661,335, filed Apr. 23, 2018, and U.S. Provisional Patent Application No. 62/829,922, filed Apr. 5, 2019, all of which are incorporated herein by reference in their entireties.

BACKGROUND

Fire apparatuses may be configured as rear-mount aerial fire apparatuses or mid-mount aerial fire apparatuses. Further, such fire apparatuses may be configured as quint configuration fire apparatuses including an aerial ladder, a water tank, a water pump, ground ladder storage, and hose storage. The weight of such fire apparatuses are often quite high to accommodate the considerable extensible length of the aerial ladder. However, a high gross vehicle weight may exceed some state vehicle weight regulations.

SUMMARY

One embodiment relates to a mid-mount fire apparatus. The mid-mount fire apparatus includes a chassis, a body assembly coupled to the chassis, a front cabin coupled to the chassis forward of the body assembly, a front axle coupled to the chassis, a tandem rear axle coupled to the chassis, and a ladder assembly having a proximal end that is coupled to the chassis rearward of the front cabin and between the front axle and the tandem rear axle. The ladder assembly includes a plurality of ladder sections. The mid-mount fire apparatus has an overall length with (i) a first portion extending from a rear end of the body assembly to a middle of the tandem rear axle and (ii) a second portion extending from the middle of the tandem rear axle to a front end of the front cabin. The first portion is at most 160 inches, the second portion is at least 320 inches, and the overall length is at most 502 inches. The ladder assembly is extensible to a horizontal reach of at least 88 feet. A distal end of the ladder assembly does not extend beyond the rear end of the body assembly when fully retracted.

Another embodiment relates to a mid-mount fire apparatus. The mid-mount fire apparatus includes a chassis, a body assembly coupled to the chassis, a front cabin coupled to the chassis forward of the body assembly, a front axle coupled to the chassis, a tandem rear axle coupled to the chassis, and a ladder assembly including a base section and a plurality of extensible ladder sections. The base section has a proximal end that is coupled to the chassis rearward of the front cabin and between the front axle and the tandem rear axle. The ladder assembly is extensible to a horizontal reach of at least 88 feet. At least one of the plurality of extensible ladder sections is configured to over-retract past the proximal end of the base ladder section when the ladder assembly is in a stowed position. A distal end of the ladder assembly does not extend beyond the rear end of the body assembly when the ladder assembly is in the stowed position.

Still another embodiment relates to a mid-mount fire apparatus. The mid-mount fire apparatus includes a chassis, a body assembly coupled to the chassis, a front cabin coupled to the chassis forward of the body assembly, a front axle coupled to the chassis, a tandem rear axle coupled to the chassis where the tandem rear axle has a gross axle weight rating of no more than 48,000 pounds, and a ladder assembly. The ladder assembly includes a base ladder section, a plurality of extensible ladder sections, and a basket. The base ladder section has a proximal end that is coupled to the chassis rearward of the front cabin and between the front axle and the tandem rear axle. The plurality of extensible ladder sections include a fly section. The basket is coupled to a distal end of the fly section. The ladder assembly is extensible to a horizontal reach of 93 feet. At least one of the plurality of extensible ladder sections is configured to over-retract past the proximal end of the base ladder section when the ladder assembly is in a stowed position. The basket does not extend beyond a rear end of the body assembly when the ladder assembly is in the stowed position.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
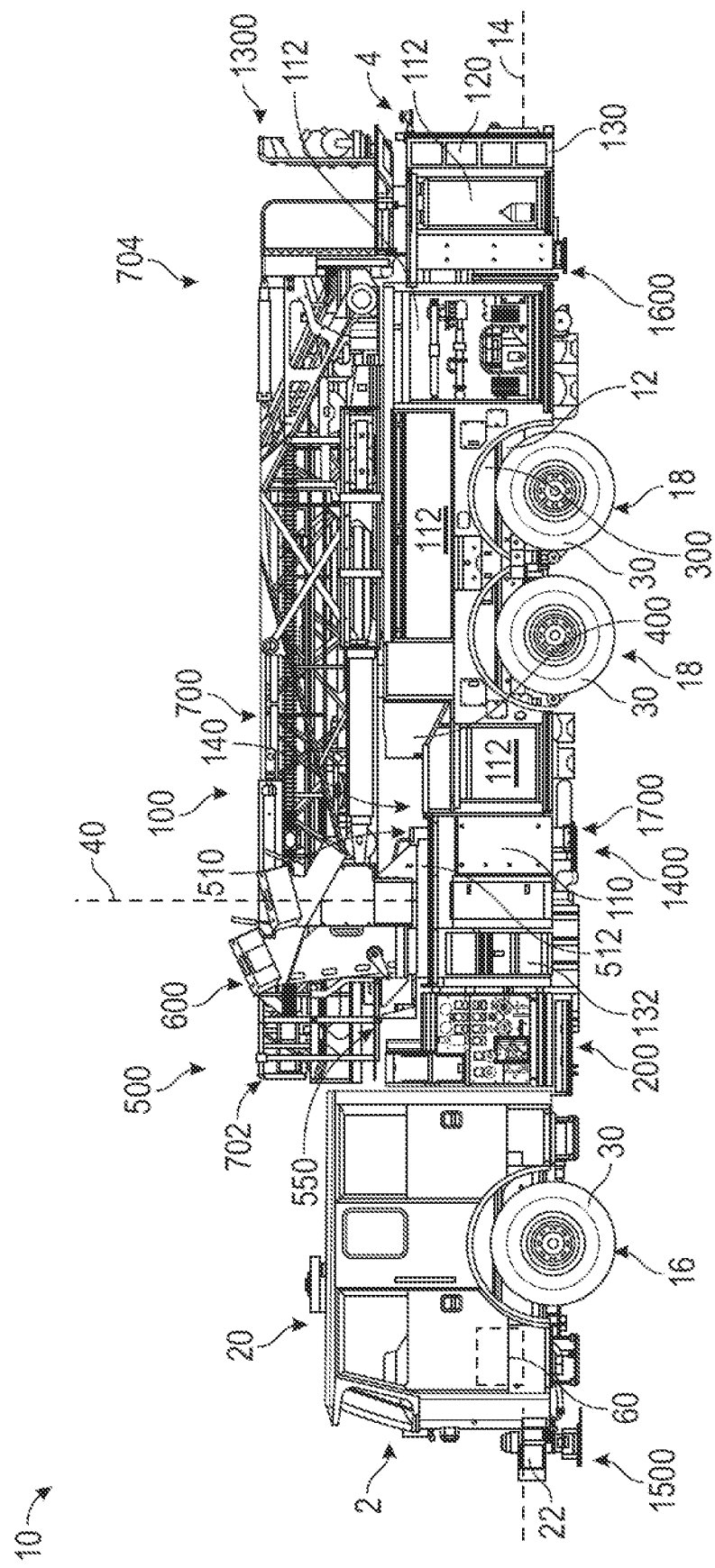
FIG. 1 is a left side view of a mid-mount fire apparatus, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a vehicle includes various components that improve performance relative to traditional systems. In one embodiment, the vehicle is a mid-mount quint configuration fire apparatus that includes a water tank, an aerial ladder, hose storage, ground ladder storage, and a water pump. The aerial ladder is coupled to the chassis between a front axle assembly and a rear axle assembly of the fire apparatus and rotatable about an axis. The water pump is positioned forward of the axis. The aerial ladder is extensible to provide a horizontal reach of at least 88 feet and a vertical reach of at least 95 feet. The aerial ladder has at least a 1,000 pound tip load rating when the aerial ladder is fully extended (e.g., without a basket coupled to a distal end thereof, etc.). The rear axle assembly may be a tandem rear axle having a gross axle weight rating of no more than 48,000 pounds. The fire apparatus has an overall length (e.g., when viewed from the side, etc.) with (i) a first portion extending from the rear end of the body assembly to a middle of the rear axle and (ii) a second portion extending from the middle of the rear axle to the front end of the front cabin. The second portion is at least twice the length of first portion. The water tank may have a capacity of up to or more than 300 gallons.

According to the exemplary embodiment shown in FIGS. 1-21, a vehicle, shown as fire apparatus 10, is configured as a mid-mount quint fire truck having a tandem rear axle. A "quint" fire truck as used herein may refer to a fire truck that includes a water tank, an aerial ladder, hose storage, ground ladder storage, and a water pump. In other embodiments, the fire apparatus 10 is configured as a mid-mount quint fire truck having a single rear axle. A tandem rear axle may include two solid axle configurations or may include two pairs of axles (e.g., two pairs of half shafts, etc.) each having a set of constant velocity joints and coupling two differentials to two pairs of hub assemblies. A single rear axle chassis may include one solid axle configuration or may include one pair of axles each having a set of constant velocity joints and coupling a differential to a pair of hub assemblies, according to various alternative embodiments. In still other embodiments, the fire apparatus 10 is configured as a non-quint mid-mount fire truck having a single rear axle or a tandem rear axle. In yet other embodiments, the fire apparatus 10 is configured as a rear-mount, quint or non-quint, single rear axle or tandem rear axle, fire truck.

As shown in FIGS. 1-7,10-13,17, and 18, the fire apparatus 10 includes a chassis, shown as frame 12, having longitudinal frame rails that define an axis, shown as longitudinal axis 14, that extends between a first end, shown as front end 2, and an opposing second end, shown as rear end 4, of the fire apparatus 10; a first axle, shown as front axle 16, coupled to the frame 12; one or more second axles, shown as rear axles 18, coupled to the frame 12; a first assembly, shown as front cabin 20, coupled to and supported by the frame 12 and having a bumper, shown as front bumper 22; a prime mover, shown as engine 60, coupled to and supported by the frame 12; and a second assembly, shown as rear assembly 100, coupled to and supported by the frame 12.

As shown in FIGS. 1-7, 10, and 12, the front axle 16 and the rear axles 18 include tractive assemblies, shown as wheel and tire assemblies 30. As shown in FIGS. 1-4, the front cabin 20 is positioned forward of the rear assembly 100 (e.g., with respect to a forward direction of travel for the fire apparatus 10 along the longitudinal axis 14, etc.). According to an alternative embodiment, the cab assembly may be positioned behind the rear assembly 100 (e.g., with respect to a forward direction of travel for the fire apparatus 10 along the longitudinal axis 14, etc.). The cab assembly may be positioned behind the rear assembly 100 on, by way of example, a rear tiller fire apparatus. In some embodiments, the fire apparatus 10 is a ladder truck with a front portion that includes the front cabin 20 pivotally coupled to a rear portion that includes the rear assembly 100.

According to an exemplary embodiment, the engine 60 receives fuel (e.g., gasoline, diesel, etc.) from a fuel tank and combusts the fuel to generate mechanical energy. A transmission receives the mechanical energy and provides an output to a drive shaft. The rotating drive shaft is received by a differential, which conveys the rotational energy of the drive shaft to a final drive (e.g., the front axle 16, the rear axles 18, the wheel and tire assemblies 30, etc.). The final drive then propels or moves the fire apparatus 10. According to an exemplary embodiment, the engine 60 is a compression-ignition internal combustion engine that utilizes diesel fuel. In alternative embodiments, the engine 60 is another type of prime mover (e.g., a spark-ignition engine, a fuel cell, an electric motor, etc.) that is otherwise powered (e.g., with gasoline, compressed natural gas, propane, hydrogen, electricity, etc.).

As shown in FIGS. 1-7, 10-13, and 17-19, the rear assembly 100 includes a body assembly, shown as body 110, coupled to and supported by the frame 12; a fluid driver, shown as pump system 200, coupled to and supported by the frame 12; a chassis support member, shown as torque box 300, coupled to and supported by the frame 12; a fluid reservoir, shown as water tank 400, coupled to the body 110 and supported by the torque box 300 and/or the frame 12; and an aerial assembly, shown as aerial assembly 500, pivotally coupled to the torque box 300 and supported by the torque box 300 and/or the frame 12. In some embodiments, the rear assembly 100 does not include the water tank 400. In some embodiments, the rear assembly 100 additionally or alternatively includes an agent or foam tank (e.g., that receives and stores a fire suppressing agent, foam, etc.).

As shown in FIGS. 1, 2, and 10-12, the sides of the body 110 define a plurality of compartments, shown as storage compartments 112. The storage compartments 112 may receive and store miscellaneous items and gear used by emergency response personnel (e.g., helmets, axes, oxygen tanks, hoses, medical kits, etc.). As shown in FIGS. 5, 6, and 10-12, the rear end 4 of the body 110 defines a longitudinal storage compartment that extends along the longitudinal axis 14, shown as ground ladder compartment 114. The ground ladder compartment 114 may receive and store one or more ground ladders. As shown in FIGS. 3, 5, and 10-13, a top surface, shown as top platform 122, of the body 110 defines a cavity, shown as hose storage platform 116, and a channel, shown as hose chute 118, extending from the hose storage platform 116 to the rear end 4 of the body 110. The hose storage platform 116 may receive and store one or more hoses (e.g., up to 1000 feet of 5 inch diameter hose, etc.), which may be pulled from the hose storage platform 116 though the hose chute 118.

As shown in FIGS. 1-6 and 10-13, the rear end 4 of the body 110 has notched or clipped corners, shown as chamfered corners 120. In other embodiments, the rear end 4 of the body 110 does not have notched or clipped corners (e.g., the rear end 4 of the body 110 may have square corners, etc.). According to an exemplary embodiment, the chamfered corners 120 provide for increased turning clearance relative to fire apparatuses that have non-notched or non-clipped (e.g., square, etc.) corners. As shown in FIGS. 1-3, 5, 6, and 10-13, the rear assembly 100 includes a first selectively deployable ladder, shown as rear ladder 130, coupled to each of the chamfered corners 120 of the body 110. According to an exemplary embodiment, the rear ladders 130 are hingedly coupled to the chamfered corners 120 and repositionable between a stowed position (see, e.g., FIGS. 1-3, 5, 12, 13, etc.) and a deployed position (see, e.g., FIGS. 6, 10, 11, etc.). The rear ladders 130 may be selectively deployed such that a user may climb the rear ladder 130 to access the top platform 122 of the body 110 and/or one or more components of the aerial assembly 500 (e.g., a work basket, an implement, an aerial ladder assembly, the hose storage platform 116, etc.). In other embodiments, the body 110 has stairs in addition to or in place of the rear ladders 130.

As shown in FIGS. 1, 12, 17, and 18, the rear assembly 100 includes a second selectively deployable ladder, shown as side ladder 132, coupled to a side (e.g., a left side, a right side, a driver's side, a passenger's side, etc.) of the body 110. In some embodiments, the rear assembly 100 includes two side ladders 132, one coupled to each side of the body 110. According to an exemplary embodiment, the side ladder 132 is hingedly coupled to the body 110 and repositionable between a stowed position (see, e.g., FIGS. 1, 2, 17, 18, etc.) and a deployed position. The side ladder 132 may be selectively deployed such that a user may climb the side ladder 132 to access one or more components of the aerial assembly 500 (e.g., a work platform, an aerial ladder assembly, a control console, etc.).

As shown in FIGS. 1, 2, 12 and 13, the body 110 defines a recessed portion, shown as aerial assembly recess 140, positioned (i) rearward of the front cabin 20 and (ii) forward of the water tank 400 and/or the rear axles 18. The aerial assembly recess 140 defines an aperture, shown as pedestal opening 142, rearward of the pump system 200.

According to an exemplary embodiment the water tank 400 is coupled to the frame 12 with a superstructure (e.g., disposed along a top surface of the torque box 300, etc.). As shown in FIGS. 1, 2, 12, and 13, the water tank 400 is positioned below the aerial ladder assembly 700 and forward of the hose storage platform 116. As shown in FIGS. 1, 2, 12 and 13, the water tank 400 is positioned such that the water tank 400 defines a rear wall of the aerial assembly recess 140. In one embodiment, the water tank 400 stores up to 300 gallons of water. In another embodiment, the water tank 400 stores more than or less than 300 gallons of water (e.g., 100, 200, 250, 350, 400, 500, etc. gallons). In other embodiments, fire apparatus 10 additionally or alternatively includes a second reservoir that stores another firefighting agent (e.g., foam, etc.). In still other embodiments, the fire apparatus 10 does not include the water tank 400 (e.g., in a non-quint configuration, etc.).

As shown in FIGS. 1-3, 5-7, 10, 17, and 18, the aerial assembly 500 includes a turntable assembly, shown as turntable 510, pivotally coupled to the torque box 300; a platform, shown work platform 550, coupled to the turntable 510; a console, shown as control console 600, coupled to the turntable 510; a ladder assembly, shown as aerial ladder assembly 700, having a first end (e.g., a base end, a proximal end, a pivot end, etc.), shown as proximal end 702, pivotally coupled to the turntable 510, and an opposing second end (e.g., a free end, a distal end, a platform end, an implement end, etc.), shown as distal end 704; and an implement, shown as work basket 1300, coupled to the distal end 704.

Figure 12:
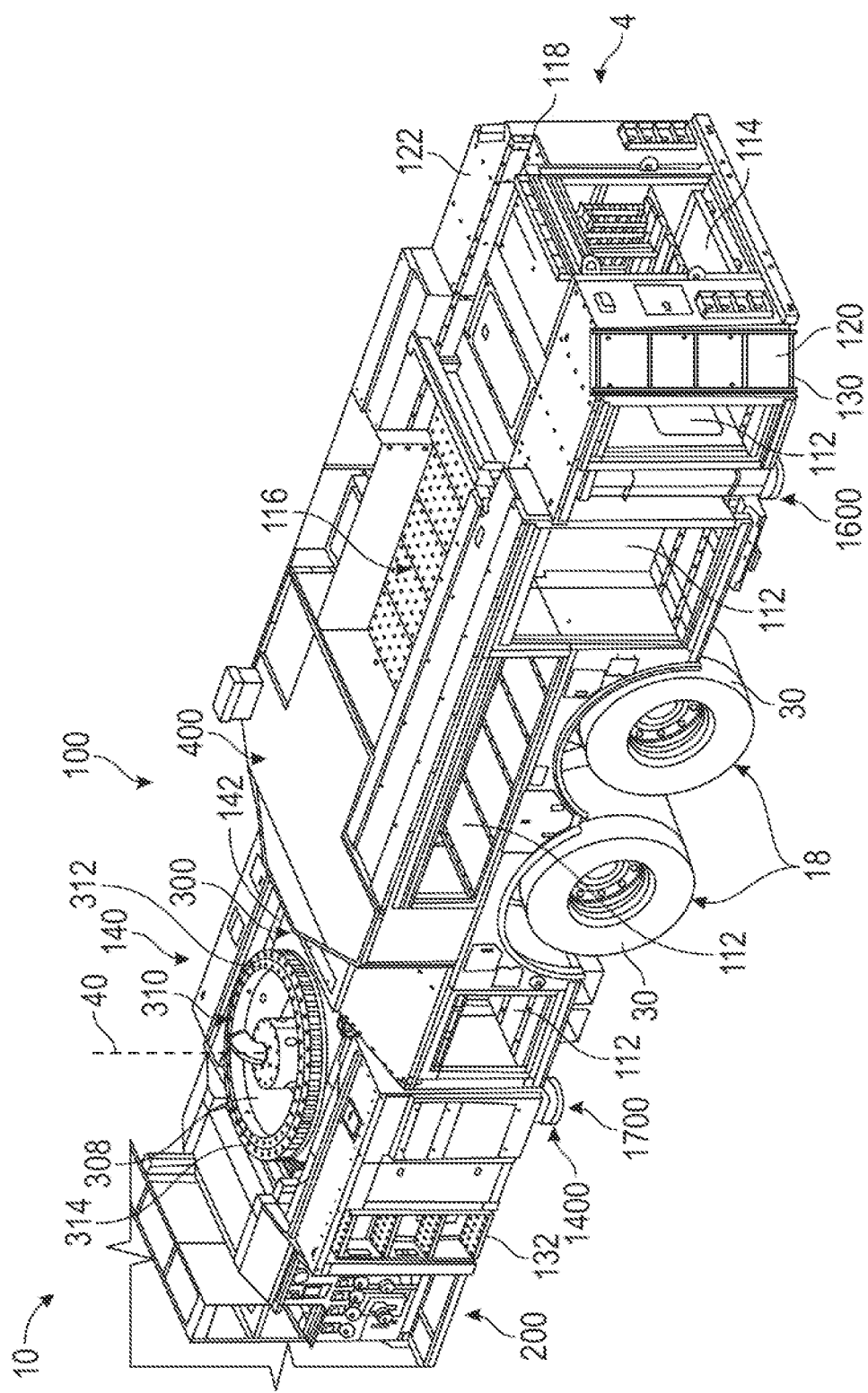
FIG. 12 is another rear perspective view of the rear assembly of FIG. 10 without a ladder assembly, according to an exemplary embodiment.
Figure 13:
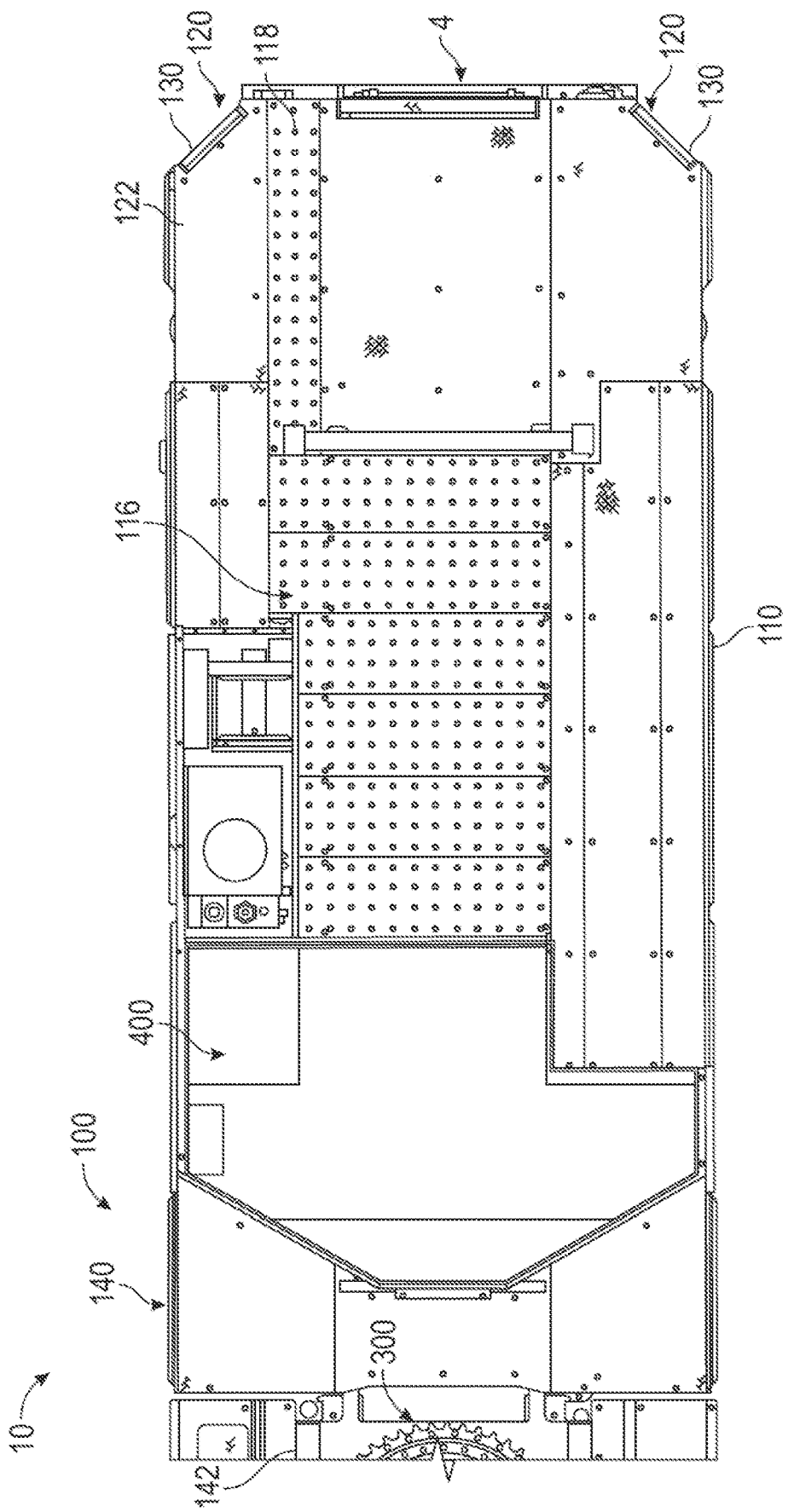
FIG. 13 is a top view of the rear assembly of FIG. 12, according to an exemplary embodiment.
Figure 14:
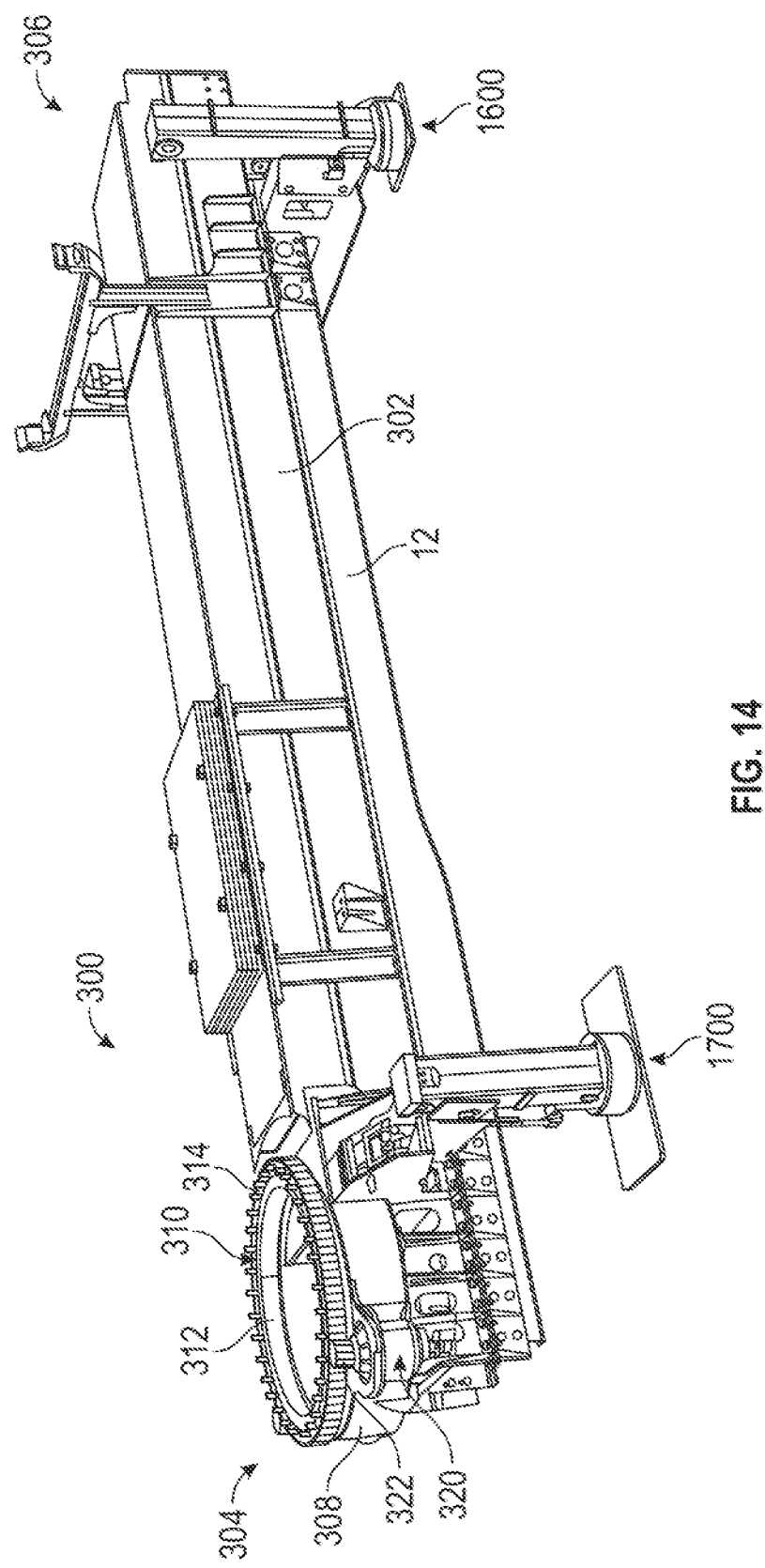
FIG. 14 is a perspective view of a torque box of the mid-mount fire apparatus of FIG. 1, according to an exemplary embodiment.
Figure 15:
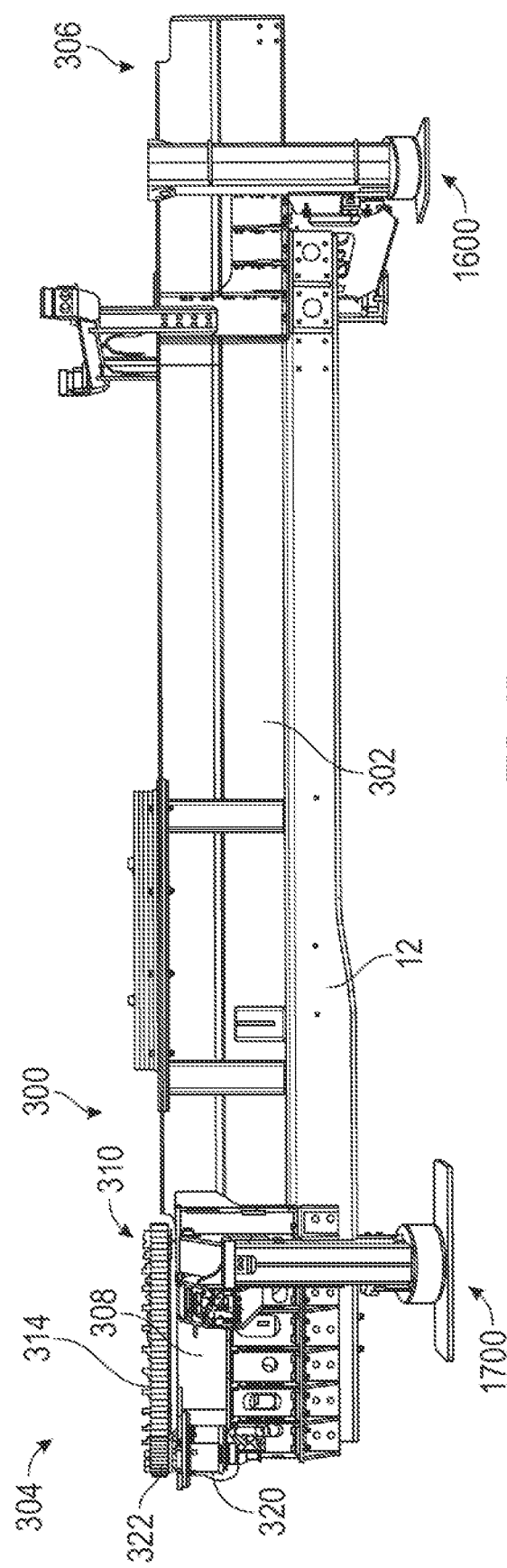
FIG. 15 is a side view of the torque box of FIG. 14, according to an exemplary embodiment.

As shown in FIGS. 1, 2, 4, 14, and 15, the torque box 300 is coupled to the frame 12. In one embodiment, the torque box 300 extends laterally the full width between the lateral outsides of the frame rails of the frame 12. As shown in FIGS. 14 and 15, the torque box 300 includes a body portion, shown as body 302, having a first end, shown as front end 304, and an opposing second end, shown as rear end 306. As shown in FIGS. 12, 14, and 15, the torque box 300 includes a support, shown as pedestal 308, coupled (e.g., attached, fixed, bolted, welded, etc.) to the front end 304 of the torque box 300. As shown in FIG. 12, the pedestal 308 extends through the pedestal opening 142 into the aerial assembly recess 140 such that the pedestal 308 is positioned (i) forward of the water tank 400 and the rear axles 18 and (ii) rearward of pump system 200, the front axle 16, and the front cabin 20.

Figure 2:
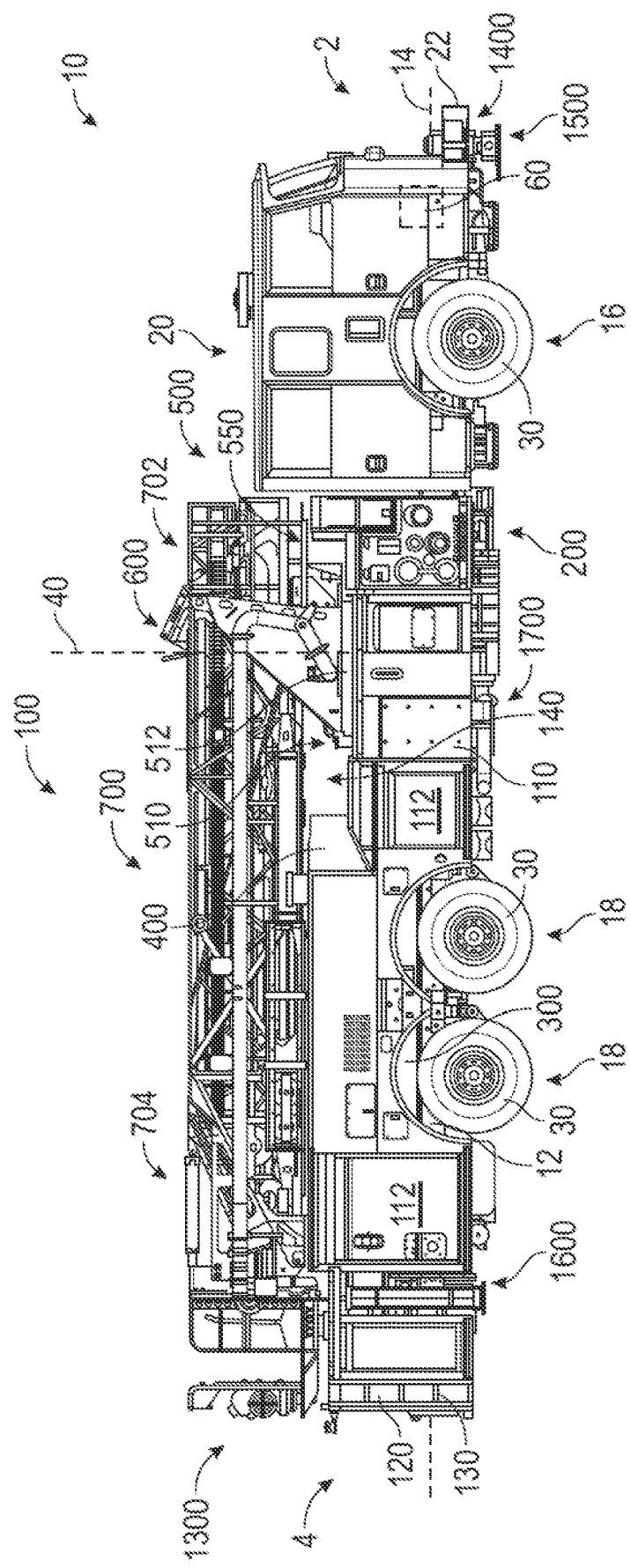
FIG. 2 is a right side view of the mid-mount fire apparatus of FIG. 1, according to an exemplary embodiment.

According to the exemplary embodiment shown in FIGS. 1, 2, and 12, the aerial assembly 500 (e.g., the turntable 510, the work platform 550, the control console 600, the aerial ladder assembly 700, the work basket 1300, etc.) is rotatably coupled to the pedestal 308 such that the aerial assembly 500 is selectively repositionable into a plurality of operating orientations about a vertical axis, shown as vertical pivot axis 40. As shown in FIGS. 12, 14, and 15, the torque box 300 includes a pivotal connector, shown as slewing bearing 310, coupled to the pedestal 308. The slewing bearing 310 is a rotational rolling-element bearing with an inner element, shown as bearing element 312, and an outer element, shown as driven gear 314. The bearing element 312 may be coupled to the pedestal 308 with a plurality of fasteners (e.g., bolts, etc.).

As shown in FIGS. 14 and 15, a drive actuator, shown as rotation actuator 320, is coupled to the pedestal 308 (e.g., by an intermediate bracket, etc.). The rotation actuator 320 is positioned to drive (e.g., rotate, turn, etc.) the driven gear 314 of the slewing bearing 310. In one embodiment, the rotation actuator 320 is an electric motor (e.g., an alternating current (AC) motor, a direct current motor (DC), etc.) configured to convert electrical energy into mechanical energy. In other embodiments, the rotation actuator 320 is powered by air (e.g., pneumatic, etc.), a fluid (e.g., a hydraulic motor, a hydraulic cylinder, etc.), mechanically (e.g., a flywheel, etc.), or still another power source.

As shown in FIGS. 14 and 15, the rotation actuator 320 includes a driver, shown as drive pinion 322. The drive pinion 322 is mechanically coupled with the driven gear 314 of the slewing bearing 310. In one embodiment, a plurality of teeth of the drive pinion 322 engage a plurality of teeth on the driven gear 314. By way of example, when the rotation actuator 320 is engaged (e.g., powered, turned on, etc.), the rotation actuator 320 may provide rotational energy (e.g., mechanical energy, etc.) to an output shaft. The drive pinion 322 may be coupled to the output shaft such that the rotational energy of the output shaft drives (e.g., rotates, etc.) the drive pinion 322. The rotational energy of the drive pinion 322 may be transferred to the driven gear 314 in response to the engaging teeth of both the drive pinion 322 and the driven gear 314. The driven gear 314 thereby rotates about the vertical pivot axis 40, while the bearing element 312 remains in a fixed position relative to the driven gear 314.

As shown in FIGS. 1, 2, and 16-18, the turntable 510 includes a first portion, shown as rotation base 512, and a second portion, shown as side supports 514, that extend vertically upward from opposing lateral sides of the rotation base 512. According to an exemplary embodiment, (i) the work platform 550 is coupled to the side supports 514, (ii) the aerial ladder assembly 700 is pivotally coupled to the side supports 514, (iii) the control console 600 is coupled to the rotation base 512, and (iv) the rotation base 512 is disposed within the aerial assembly recess 140 and interfaces with and is coupled to the driven gear 314 of slewing bearing 310 such that (i) the aerial assembly 500 is selectively pivotable about the vertical pivot axis 40 using the rotation actuator 320, (ii) at least a portion of the work platform 550 and the aerial ladder assembly 700 is positioned below the roof of the front cabin 20, and (iii) the turntable 510 is coupled rearward of the front cabin 20 and between the front axle 16 and the tandem rear axles 18 (e.g., the turntable 510 is coupled to the frame 12 such that the vertical pivot axis 40 is positioned rearward of a centerline of the front axle 16, forward of a centerline of the tandem rear axle 18, rearward of a rear edge of a tire of the front axle 16, forward of a front edge of a wheel of the front axle of the tandem rear axles 18, rearward of a front edge of a tire of the front axle 16, forward of a rear edge of a wheel of the rear axle of the tandem rear axles 18, etc.). Accordingly, loading from the work basket 1300, the aerial ladder assembly 700, and/or the work platform 550 may transfer through the turntable 510 into the torque box 300 and the frame 12.

As shown in FIG. 12, the rear assembly 100 includes a rotation swivel, shown as rotation swivel 316, that includes a conduit. According to an exemplary embodiment, the conduit of the rotation swivel 316 extends upward from the pedestal 308 and into the turntable 510. The rotation swivel 316 may couple (e.g., electrically, hydraulically, fluidly, etc.) the aerial assembly 500 with other components of the fire apparatus 10. By way of example, the conduit may define a passageway for water to flow into the aerial ladder assembly 700. Various lines may provide electricity, hydraulic fluid, and/or water to the aerial ladder assembly 700, actuators, and/or the control console 600.

According to an exemplary embodiment, the work platform 550 provides a surface upon which operators (e.g., fire fighters, rescue workers, etc.) may stand while operating the aerial assembly 500 (e.g., with the control console 600, etc.). The control console 600 may be communicably coupled to various components of the fire apparatus 10 (e.g., actuators of the aerial ladder assembly 700, rotation actuator 320, water turret, etc.) such that information or signals (e.g., command signals, fluid controls, etc.) may be exchanged from the control console 600. The information or signals may relate to one or more components of the fire apparatus 10. According to an exemplary embodiment, the control console 600 enables an operator (e.g., a fire fighter, etc.) of the fire apparatus 10 to communicate with one or more components of the fire apparatus 10. By way of example, the control console 600 may include at least one of an interactive display, a touchscreen device, one or more buttons (e.g., a stop button configured to cease water flow through a water nozzle, etc.), joysticks, switches, and voice command receivers. An operator may use a joystick associated with the control console 600 to trigger the actuation of the turntable 510 and/or the aerial ladder assembly 700 to a desired angular position (e.g., to the front, back, or side of fire apparatus 10, etc.). By way of another example, an operator may engage a lever associated with the control console 600 to trigger the extension or retraction of the aerial ladder assembly 700.

Figure 16:
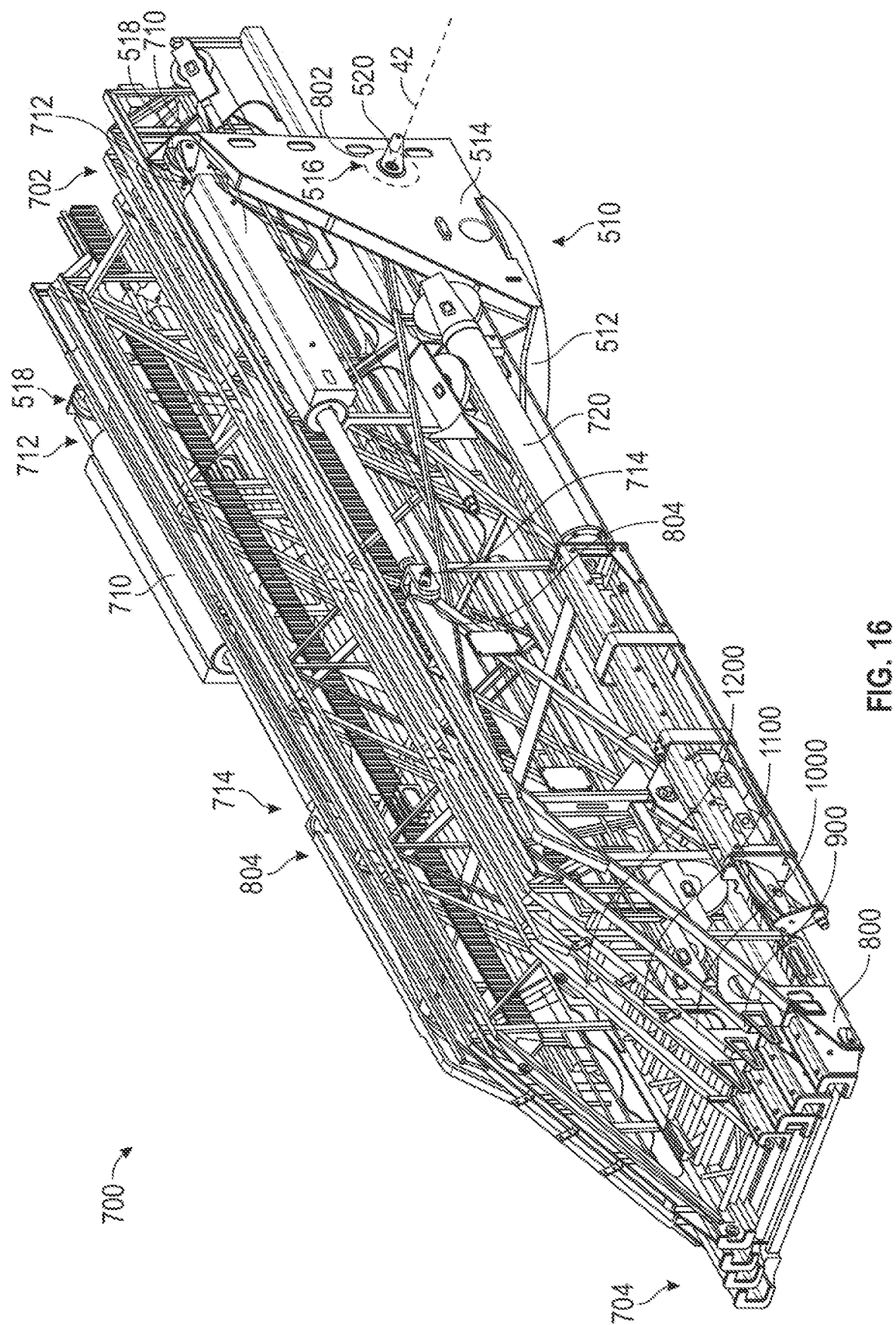
FIG. 16 is a perspective view of an aerial ladder assembly and turntable of the mid-mount fire apparatus of FIG. 1, according to an exemplary embodiment.
Figure 17:
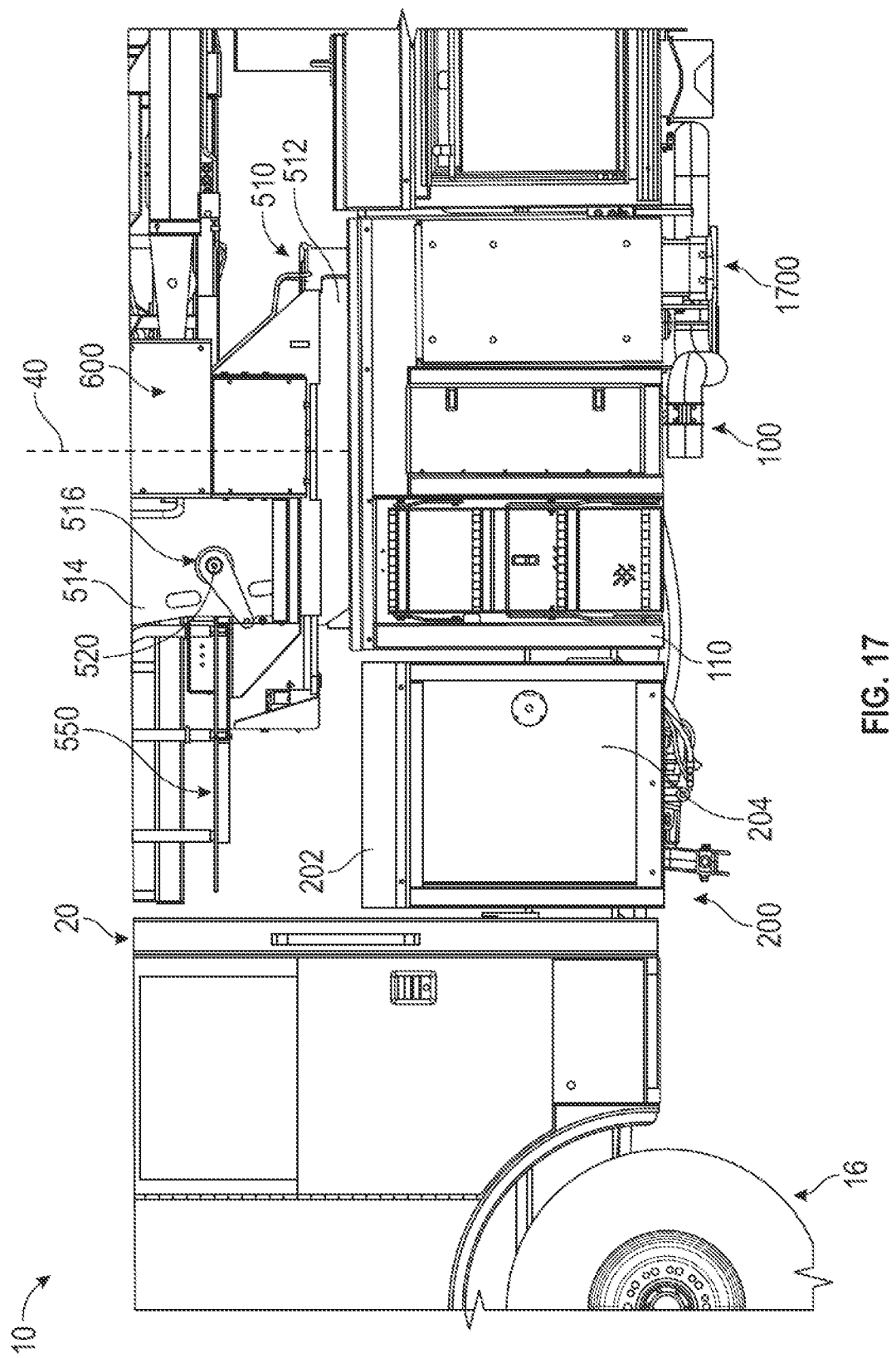
FIG. 17 is a side view of a pump housing of the mid-mount fire apparatus of FIG. 1 in a first configuration, according to an exemplary embodiment.
Figure 18:
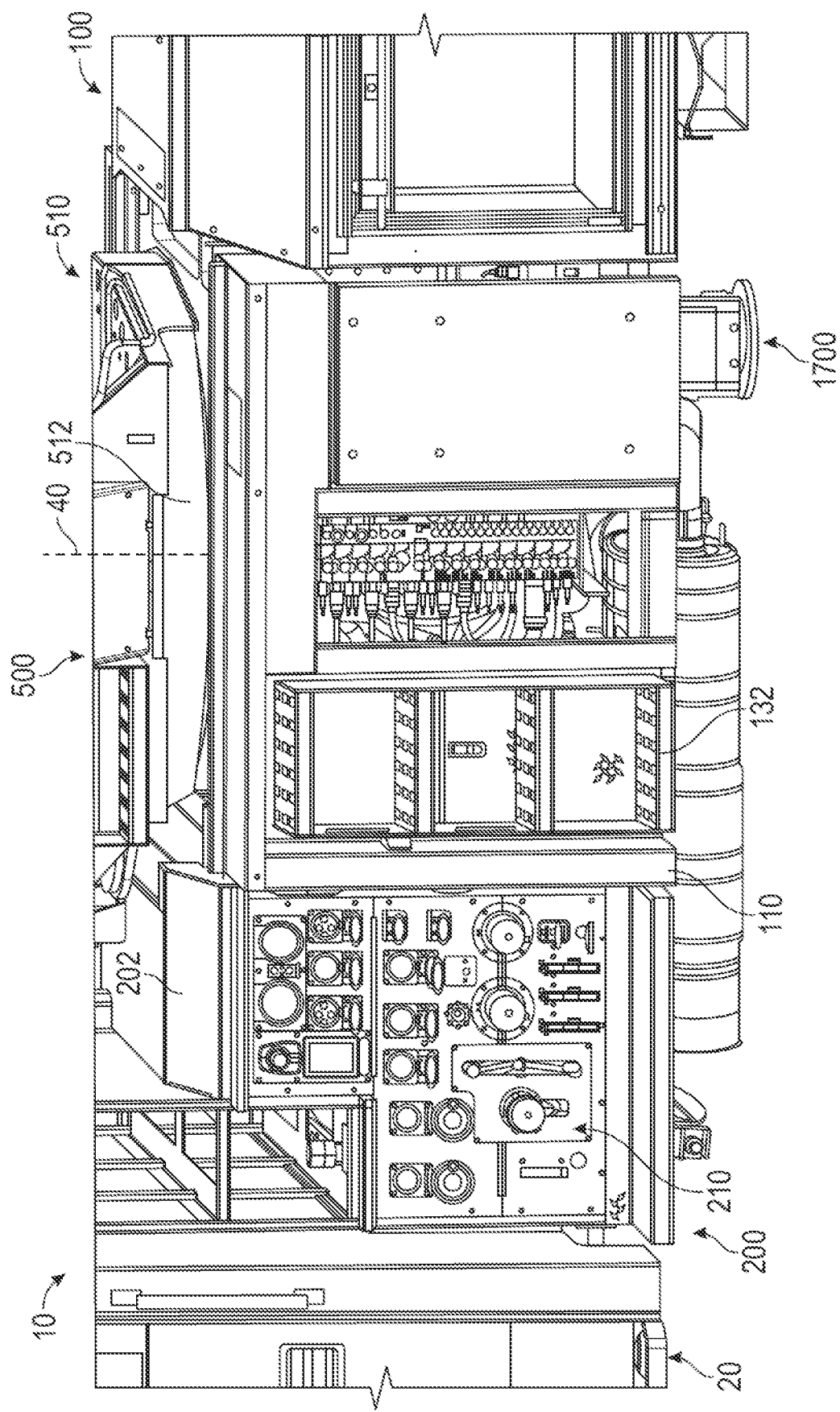
FIG. 18 is a side perspective view of a pump system within the pump housing of FIG. 17 in a second configuration, according to an exemplary embodiment.

As shown in FIG. 16, the aerial ladder assembly 700 has a plurality of nesting ladder sections that telescope with respect to one another including a first section, shown as base section 800; a second section, shown as lower middle section 900; a third ladder section, shown as middle section 1000; a fourth section, shown as upper middle section 1100; and a fifth section, shown as fly section 1200. As shown in FIGS. 16 and 17, the side supports 514 of the turntable 510 define a first interface, shown as ladder interface 516, and a second interface, shown as actuator interface 518. As shown in FIG. 16, the base section 800 of the aerial ladder assembly 700 defines first interfaces, shown as pivot interfaces 802, and second interfaces, shown as actuator interfaces 804. As shown in FIGS. 16 and 17, the ladder interfaces 516 of the side supports 514 of the turntable 510 and the pivot interfaces 802 of the base section 800 are positioned to align and cooperatively receive a pin, shown as heel pin 520, to pivotally couple the proximal end 702 of the aerial ladder assembly 700 to the turntable 510. As shown in FIG. 17, the aerial ladder assembly 700 includes first ladder actuators (e.g., hydraulic cylinders, etc.), shown as pivot actuators 710. Each of the pivot actuators 710 has a first end, shown as end 712, coupled to a respective actuator interface 518 of the side supports 514 of the turntable 510 and an opposing second end, shown as end 714, coupled to a respective actuator interface 804 of the base section 800. According to an exemplary embodiment, the pivot actuators 710 are kept in tension such that retraction thereof lifts and rotates the distal end 704 of the aerial ladder assembly 700 about a lateral axis, shown as lateral pivot axis 42, defined by the heel pin 520. In other embodiments, the pivot actuators 710 are kept in compression such that extension thereof lifts and rotates the distal end 704 of the aerial ladder assembly 700 about the lateral pivot axis 42. In an alternative embodiment, the aerial ladder assembly only includes one pivot actuator 710.

As shown in FIG. 16, the aerial ladder assembly 700 includes one or more second ladders actuators, shown as extension actuators 720. According to an exemplary embodiment, the extension actuators 720 are positioned to facilitate selectively reconfiguring the aerial ladder assembly 700 between an extended configuration and a retracted/stowed configuration (see, e.g., FIGS. 1-3, 16, etc.). In the extended configuration (e.g., deployed position, use position, etc.), the aerial ladder assembly 700 is lengthened, and the distal end 704 is extended away from the proximal end 702. In the retracted configuration (e.g., storage position, transport position, etc.), the aerial ladder assembly 700 is shortened, and the distal end 704 is withdrawn towards the proximal end 702.

According to the exemplary embodiment shown in FIGS. 1-3 and 16, the aerial ladder assembly 700 has over-retracted ladder sections such that the proximal ends of the lower middle section 900, the middle section 1000, the upper middle section 1100, and the fly section 1200 extend forward of (i) the heel pin 520 and (ii) the proximal end of the base section 800 along the longitudinal axis 14 of the fire apparatus 10 when the aerial ladder assembly 700 is retracted and stowed. According to an exemplary embodiment, the distal end 704 of the aerial ladder assembly 700 (e.g., the distal end of the fly section 1200, etc.) is extensible to the horizontal reach of at least 88 feet (e.g., 93 feet, etc.) and/or a vertical reach of at least 95 feet (e.g., 100 feet, etc.). According to an exemplary embodiment, the aerial ladder assembly 700 is operable below grade (e.g., at a negative depression angle relative to a horizontal, etc.) within an aerial work envelope or scrub area. In one embodiment, the aerial ladder assembly 700 is operable in the scrub area such that it may pivot about the vertical pivot axis 40 up to 50 degrees (e.g., 20 degrees forward and 30 degrees rearward from a position perpendicular to the longitudinal axis 14, etc.) on each side of the body 110 while at a negative depression angle (e.g., up to negative 15 degrees, more than negative 15 degrees, up to negative 20 degrees, etc. below level, below a horizontal defined by the top platform 122 of the body 110, etc.).

Figure 3:
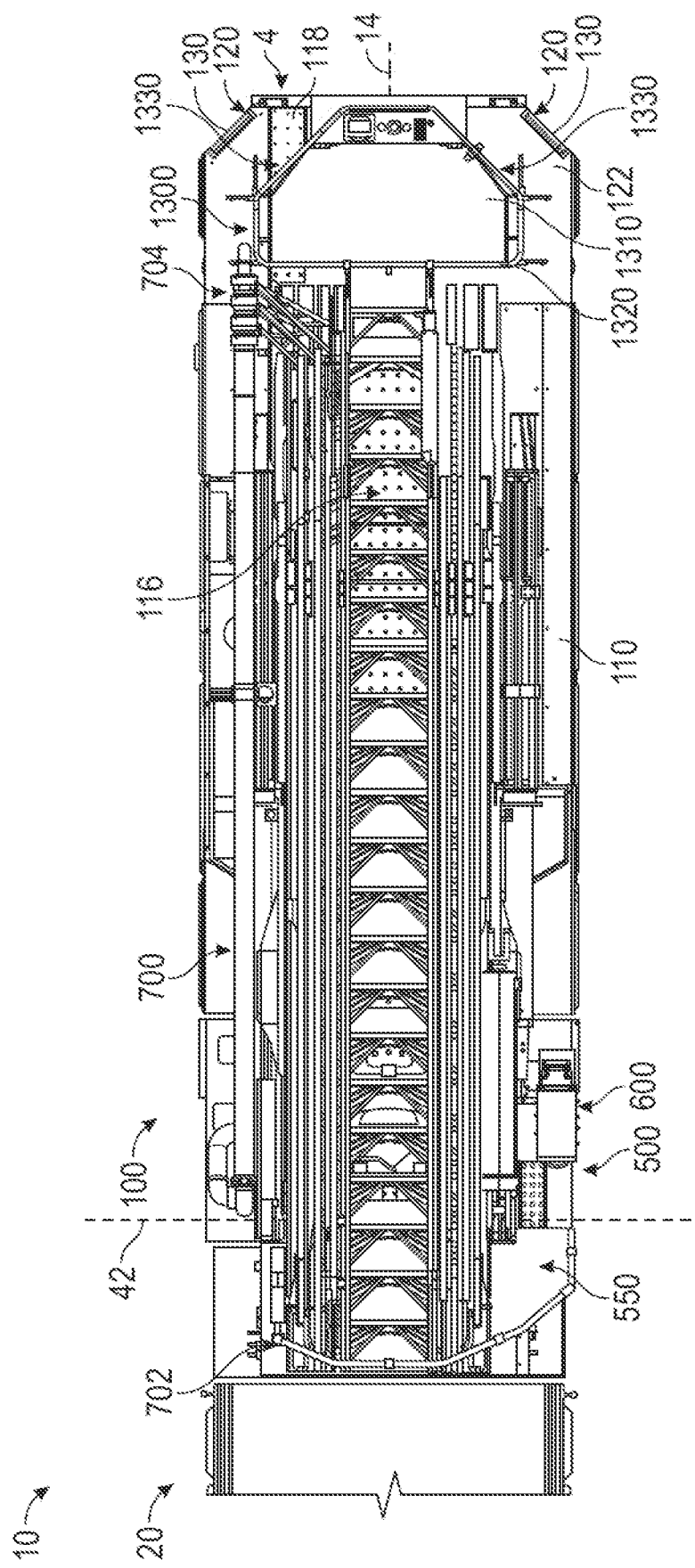
FIG. 3 is a top view of the mid-mount fire apparatus of FIG. 1, according to an exemplary embodiment.
Figure 4:
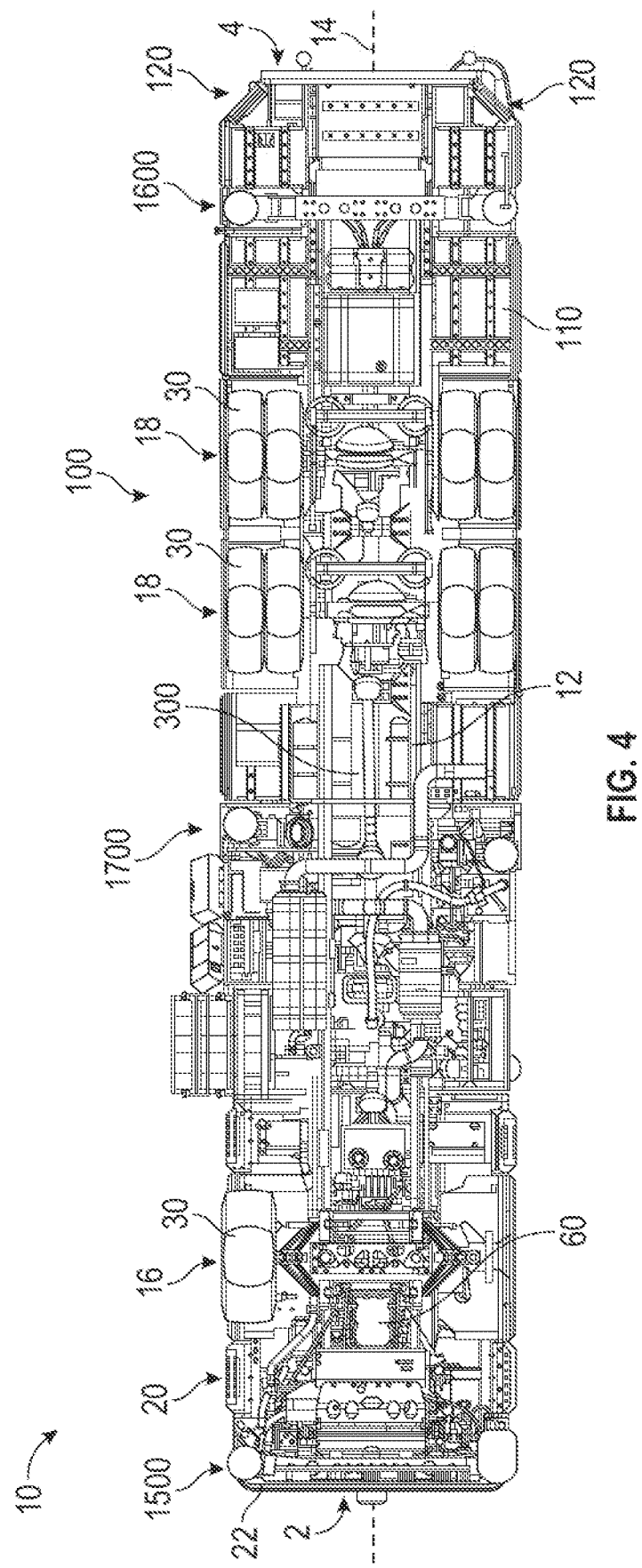
FIG. 4 is a bottom view of the mid-mount fire apparatus of FIG. 1, according to an exemplary embodiment.
Figure 5:
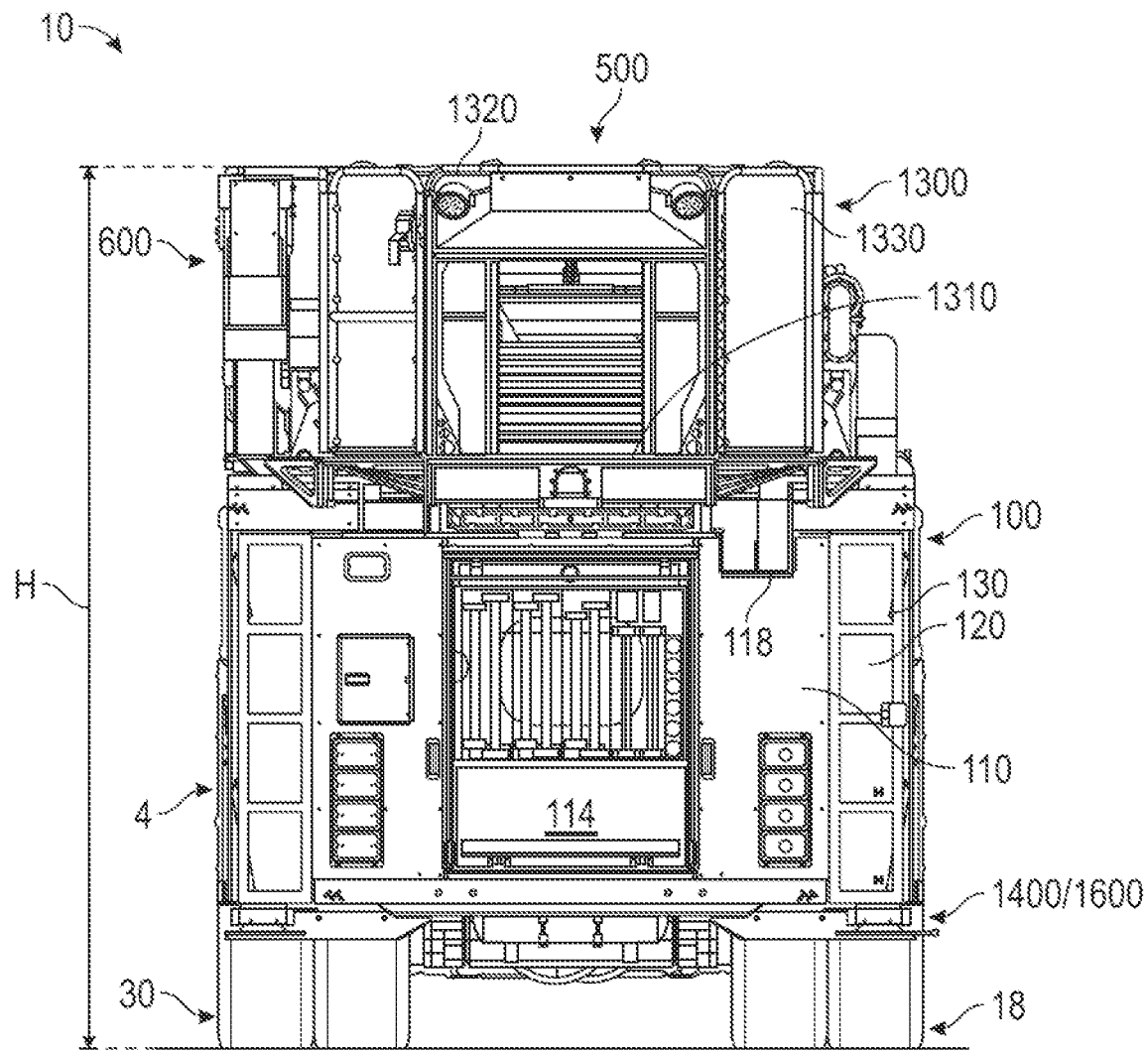
FIG. 5 is a rear view of the mid-mount fire apparatus of FIG. 1, according to an exemplary embodiment.
Figure 10:
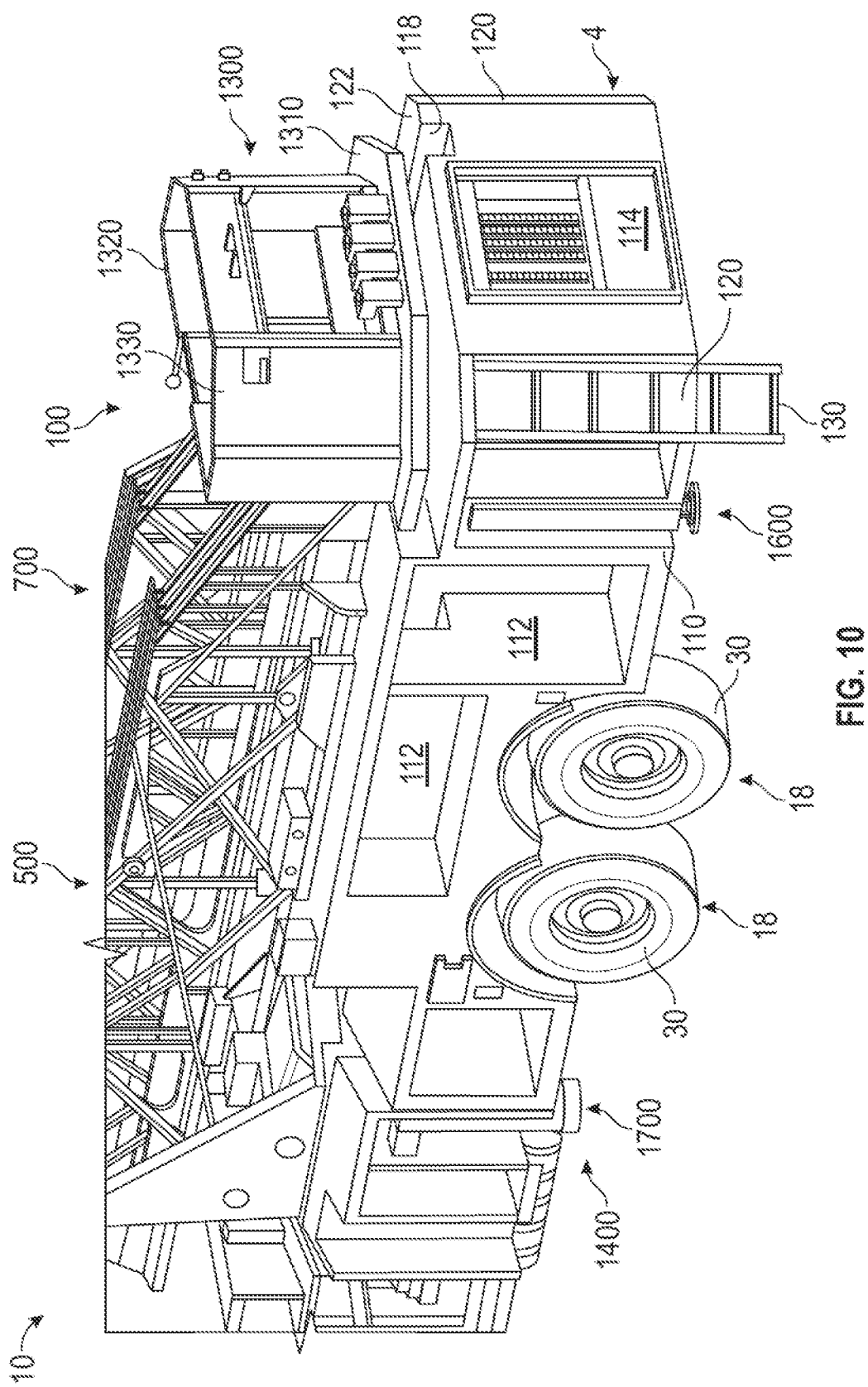
FIG. 10 is a rear perspective view of a rear assembly of the mid-mount fire apparatus of FIG. 1, according to an exemplary embodiment.
Figure 11:
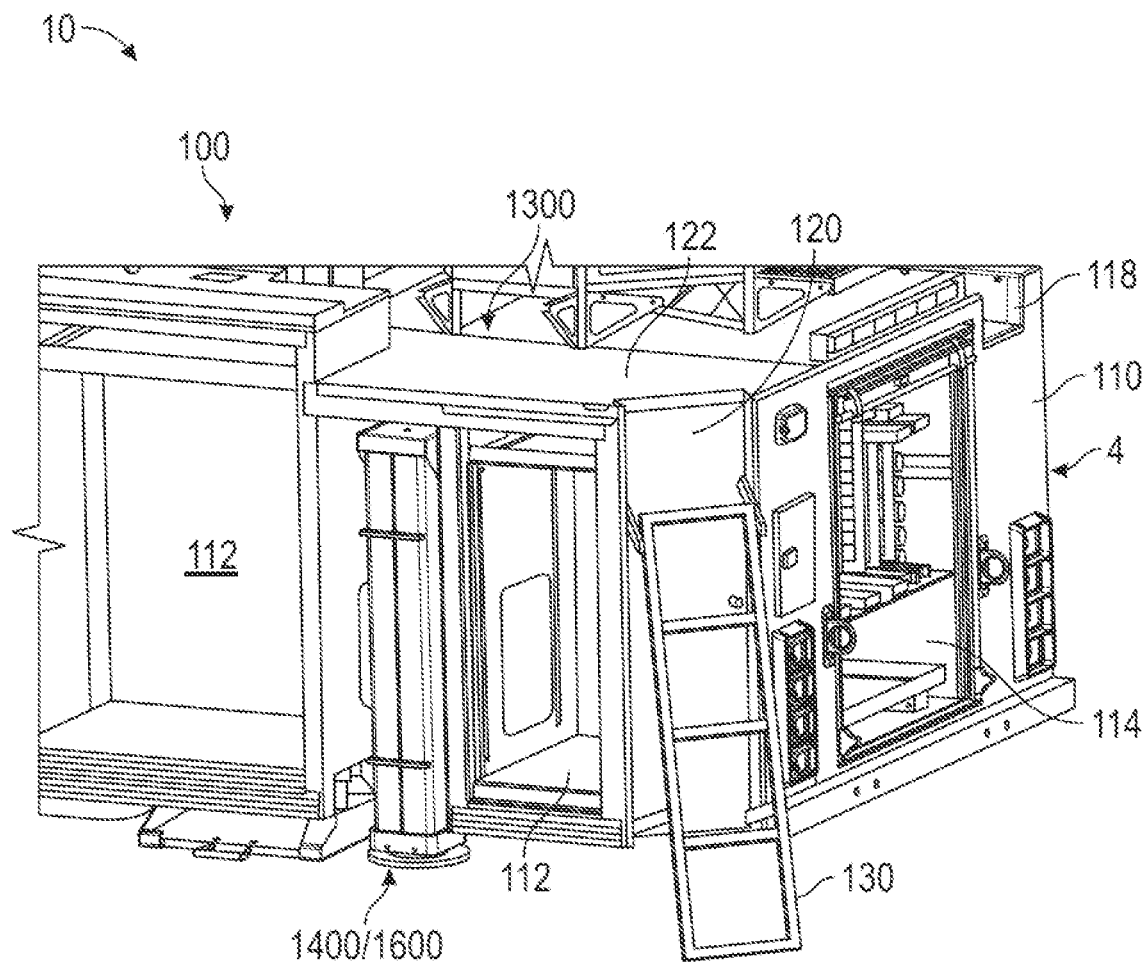
FIG. 11 is detailed rear perspective view of the rear assembly of FIG. 10, according to an exemplary embodiment.

According to an exemplary embodiment, the work basket 1300 is configured to hold at least one of fire fighters and persons being aided by the fire fighters. As shown in FIGS. 3, 5, and 10, the work basket 1300 includes a platform, shown as basket platform 1310; a support, shown as railing 1320, extending around the periphery of the basket platform 1310; and angled doors, shown as basket doors 1330, coupled to the corners of the railing 1320 proximate the rear end 4 of the fire apparatus 10. According to an exemplary embodiment, the basket doors 1330 are angled to correspond with the chamfered corners 120 of the body 110.

In other embodiments, the aerial assembly 500 does not include the work basket 1300. In some embodiments, the work basket 1300 is replaced with or additionally includes a nozzle (e.g., a deluge gun, a water cannon, a water turret, etc.) or other tool. By way of example, the nozzle may be connected to a water source (e.g., the water tank 400, an external source, etc.) with a conduit extending along the aerial ladder assembly 700 (e.g., along the side of the aerial ladder assembly 700, beneath the aerial ladder assembly 700, in a channel provided in the aerial ladder assembly 700, etc.). By pivoting the aerial ladder assembly 700 into a raised position, the nozzle may be elevated to expel water from a higher elevation to facilitate suppressing a fire.

According to an exemplary embodiment, the pump system 200 (e.g., a pump house, etc.) is a mid-ship pump assembly. As shown in FIGS. 1, 2, 12, 17, and 18, the pump system 200 is positioned along the rear assembly 100 behind the front cabin 20 and forward of the vertical pivot axis 40 (e.g., forward of the turntable 510, the torque box 300, the pedestal 308, the slewing bearing 310, the heel pin 520, a front end of the body 110, etc.) such that the work platform 550 and the over-retracted portions of the aerial ladder assembly 700 overhang above the pump system 200 when the aerial ladder assembly 700 is retracted and stowed. According to an exemplary embodiment, the position of the pump system 200 forward of the vertical pivot axis 40 facilitates ease of install and serviceability. In other embodiments, the pump system 200 is positioned rearward of the vertical pivot axis 40.

Figure 19:
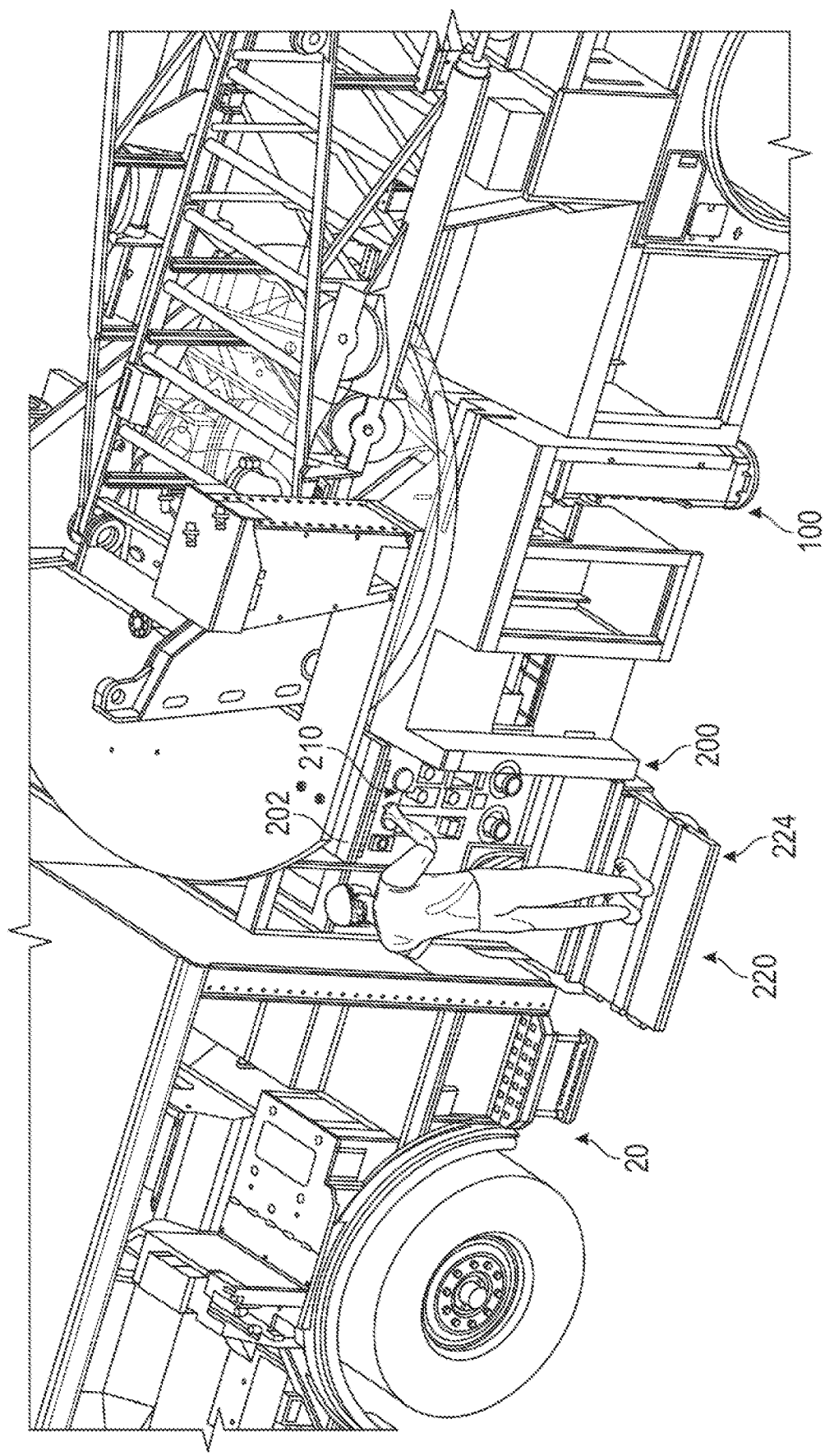
FIG. 19 is a side perspective view of the pump system of FIG. 18 with a platform in a deployed configuration, according to an exemplary embodiment.
Figure 20:
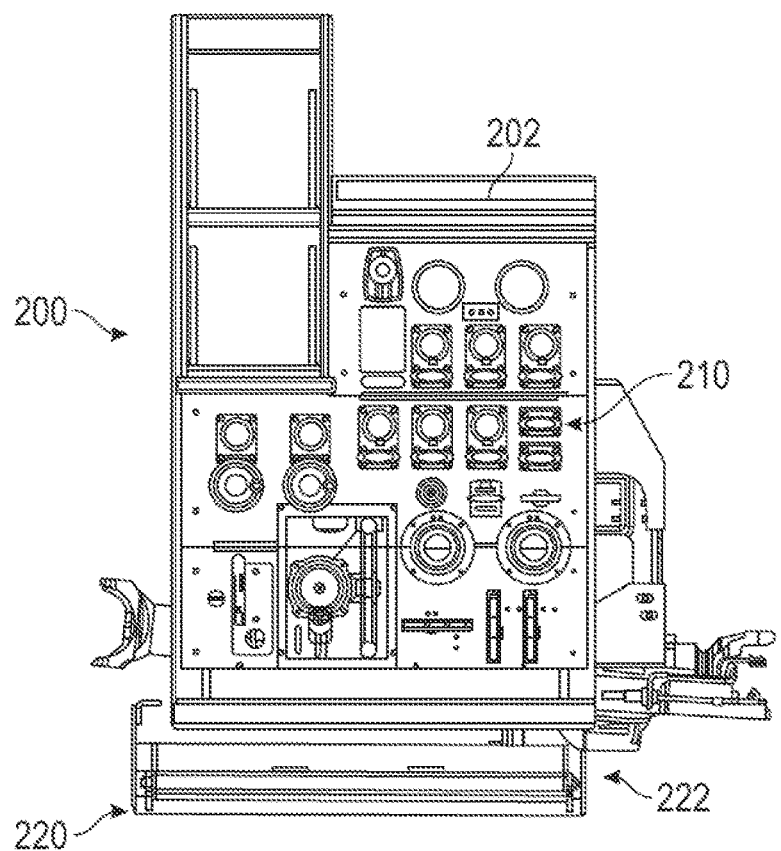
FIGS. 20 and 21 are opposing side views of the pump system of FIG. 18, according to an exemplary embodiment.
Figure 21:
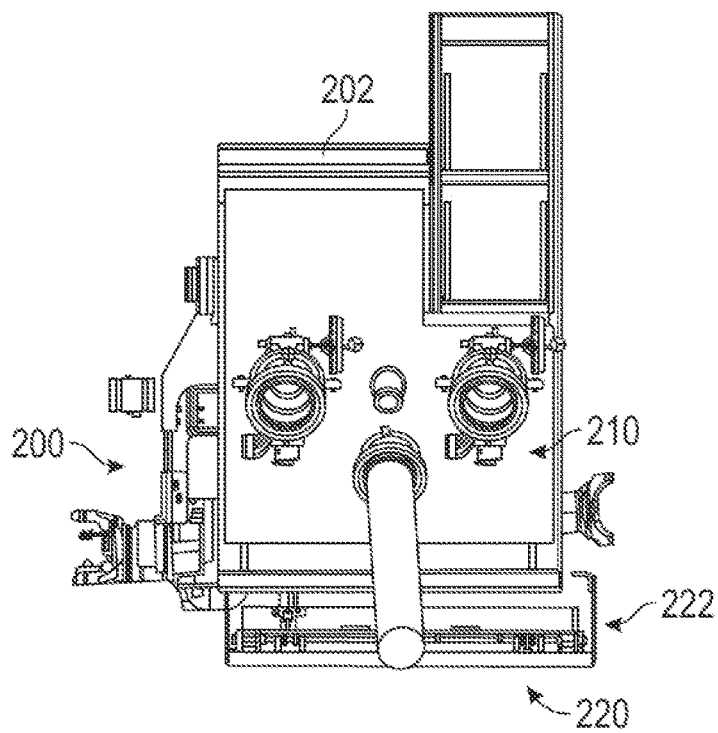

As shown in FIGS. 17-21, the pump system 200 includes a housing, shown as pump house 202. As shown in FIG. 17, the pump house 202 includes a selectively openable door, shown as pump door 204. As shown in FIGS. 18-21, the pump system 200 includes a pumping device, shown as pump assembly 210, disposed within the pump house 202. By way of example, the pump assembly 210 may include a pump panel having an inlet for the entrance of water from an external source (e.g., a fire hydrant, etc.), a pump, an outlet configured to engage a hose, various gauges, etc. The pump of the pump assembly 210 may pump fluid (e.g., water, agent, etc.) through a hose to extinguish a fire (e.g., water received at an inlet of the pump house 202, water stored in the water tank 400, etc.). As shown in FIGS. 19-21, the pump system 200 includes a selectively deployable (e.g., foldable, pivotable, collapsible, etc.) platform, shown as pump platform 220, pivotally coupled to the pump house 202. As shown in FIGS. 20 and 21, the pump platform 220 is in a first configuration, shown as stowed configuration 222, and as shown in FIG. 19, the pump platform 220 is in a second configuration, shown as deployed configuration 224.

Figure 6:
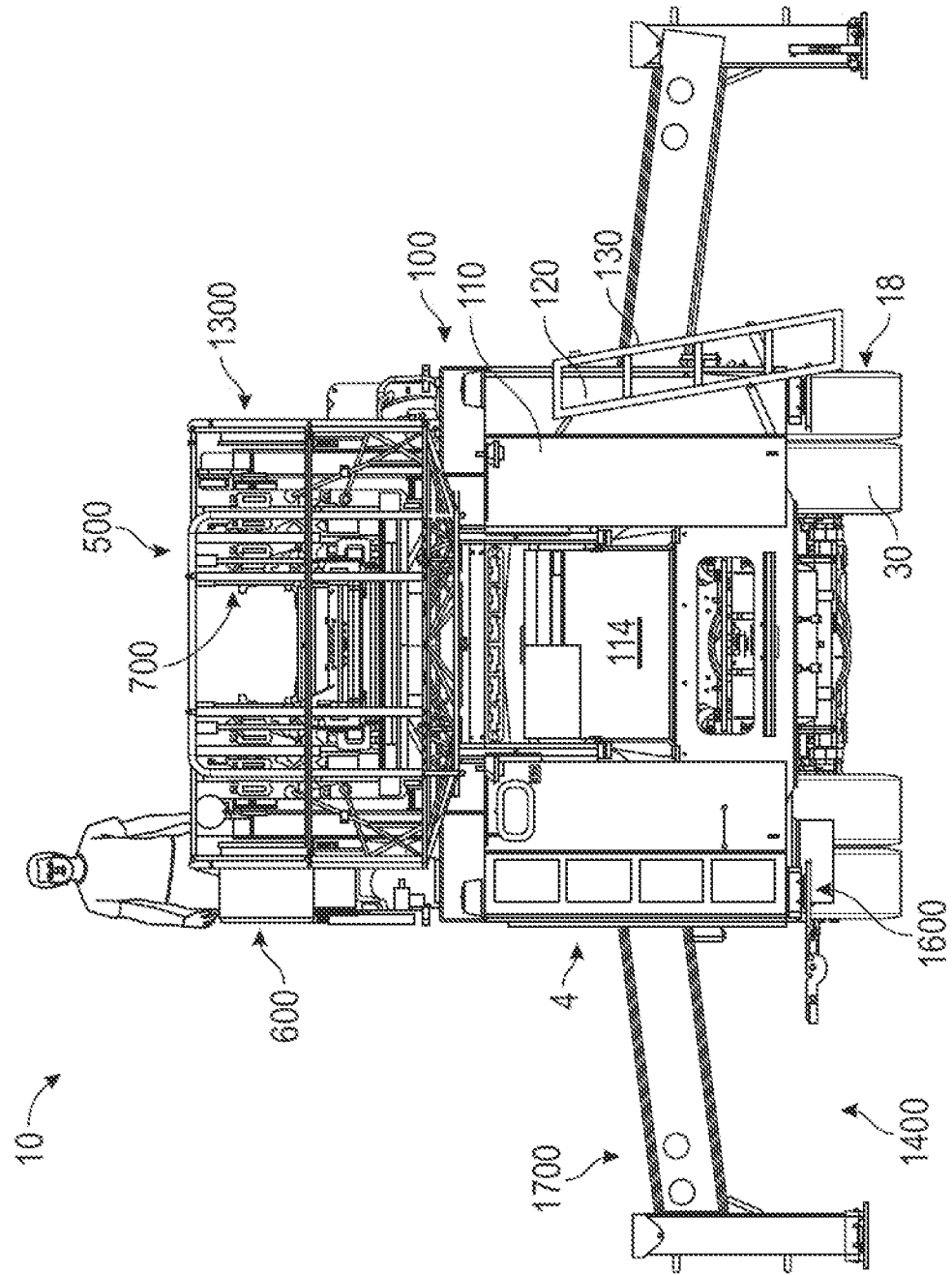
FIG. 6 is a is a rear view of the mid-mount fire apparatus of FIG.1 having outriggers in an extended configuration, according to an exemplary embodiment.
Figure 7:
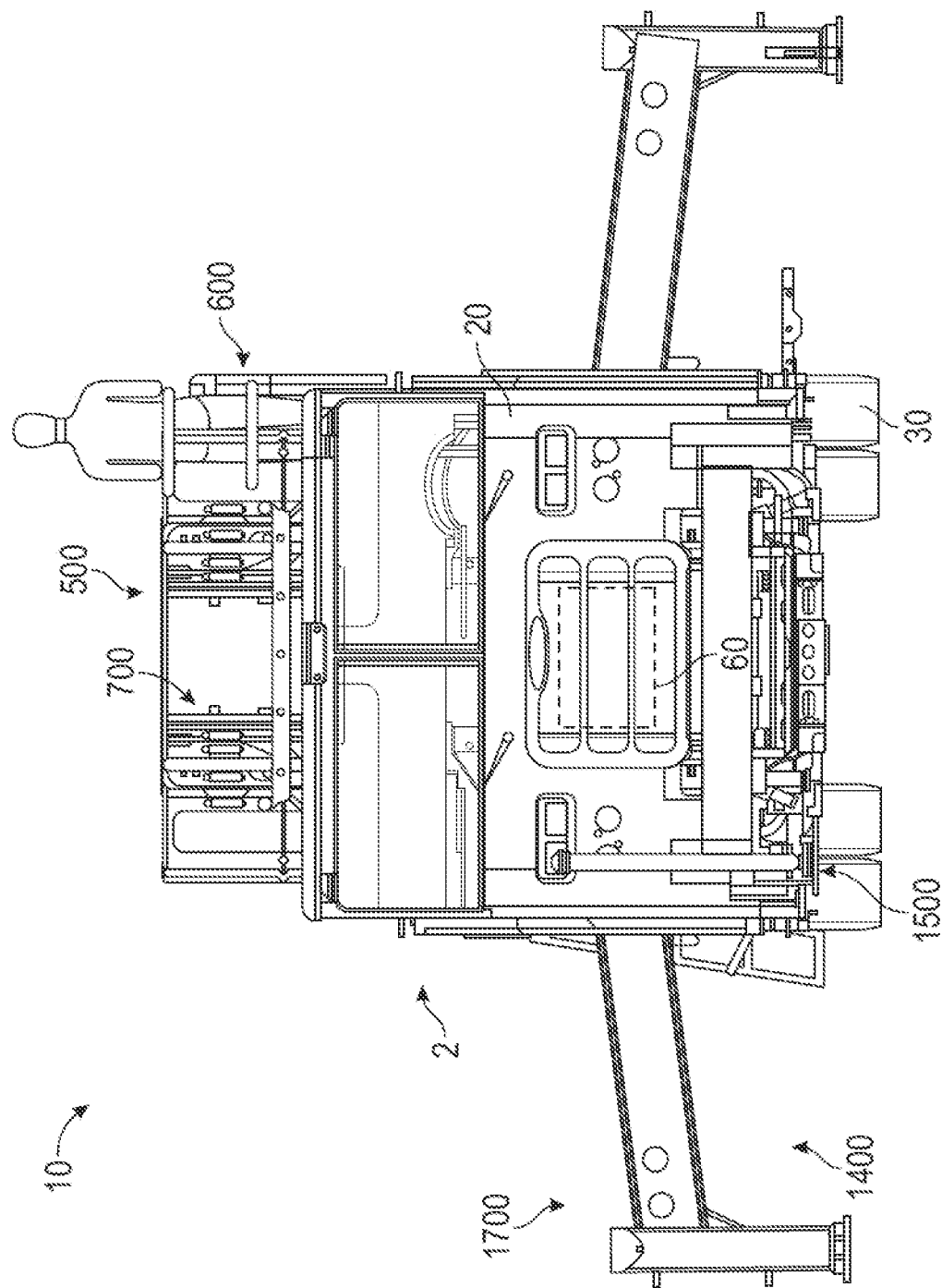
FIG. 7 is a front view of the mid-mount fire apparatus of FIG.1 having outriggers in an extended configuration, according to an exemplary embodiment.

As shown in FIGS. 1, 2, 4, 6, 7, 10-12, 14, and 15, the fire apparatus 10 includes a stability system, shown as stability assembly 1400. As shown in FIGS. 1, 2, 4, and 7, the stability assembly 1400 includes first stabilizers, shown as front downriggers 1500, coupled to each lateral side of the front bumper 22 at the front end 2 of the front cabin 20. In other embodiments, the front downriggers 1500 are otherwise coupled to the fire apparatus 10 (e.g., to the front end 2 of the frame 12, etc.). According to an exemplary embodiment, the front downriggers 1500 are selectively deployable (e.g., extendable, etc.) downward to engage a ground surface. As shown in FIGS. 1, 2, 4-6, 10-12, 14, and 15, the stability assembly 1400 includes second stabilizers, shown as rear downriggers 1600, coupled to each lateral side of the rear end 4 of the frame 12 and/or the rear end 306 of the torque box 300. According to an exemplary embodiment, the rear downriggers 1600 are selectively deployable (e.g., extendable, etc.) downward to engage a ground surface. As shown in FIGS. 1, 2, 4, 6, 7, 10, 12, 14, 15, 17, and 18, the stability assembly 1400 includes third stabilizers, shown outriggers 1700, coupled to the front end 304 of the torque box 300 between the pedestal 308 and the body 302. As shown in FIGS. 6 and 7, the outriggers 1700 are selectively deployable (e.g., extendable, etc.) outward from each of the lateral sides of the body 110 and/or downward to engage a ground surface. According to an exemplary embodiment, the outriggers 1700 are extendable up to a distance of eighteen feet (e.g., measured between the center of a pad of a first outrigger and the center of a pad of a second outrigger, etc.).

In other embodiments, the outriggers 1700 are extendable up to a distance of less than or greater than eighteen feet.

According to an exemplary embodiment, the front downriggers 1500, the rear downriggers 1600, and the outriggers 1700 are positioned to transfer the loading from the aerial ladder assembly 700 to the ground. For example, a load applied to the aerial ladder assembly 700 (e.g., a fire fighter at the distal end 704, a wind load, etc.) may be conveyed into to the turntable 510, through the pedestal 308 and the torque box 300, to the frame 12, and into the ground through the front downriggers 1500, the rear downriggers 1600, and/or the outriggers 1700. When the front downriggers 1500, the rear downriggers 1600, and/or the outriggers 1700 engage with a ground surface, portions of the fire apparatus 10 (e.g., the front end 2, the rear end 4, etc.) may be elevated relative to the ground surface. One or more of the wheel and tire assemblies 30 may remain in contact with the ground surface, but may not provide any load bearing support. While the fire apparatus 10 is being driven or not in use, the front downriggers 1500, the rear downriggers 1600, and the outriggers 1700 may be retracted into a stored position.

According to an exemplary embodiment, with (i) the front downriggers 1500, the rear downriggers 1600, and/or the outriggers 1700 extended and (ii) the aerial ladder assembly 700 fully extended (e.g., at a horizontal reach of 88 feet, at a vertical reach of 95 feet, etc.), the fire apparatus 10 withstands a rated tip load (e.g., rated meaning that the fire apparatus 10 can, from a design-engineering perspective, withstand a greater tip load, with an associated factor of safety of at least two, meets National Fire Protection Association ("NFPA") requirements, etc.) of at least 1,000 pounds applied to the work basket 1300, in addition to the weight of the work basket 1300 itself (e.g., approximately 700 pounds, etc.). In embodiments where the aerial assembly 500 does not include the work basket 1300, the fire apparatus 10 may have a rated tip load of more than 1,000 pounds (e.g., 1,250 pounds, etc.) when the aerial ladder assembly 700 is fully extended.

According to an exemplary embodiment, the tandem rear axles 18 have a gross axle weight rating of up to 48,000 pounds and the fire apparatus 10 does not exceed the 48,000 pound tandem-rear axle rating. The front axle 16 may have a 24,000 pound axle rating. Traditionally, mid-mount fire trucks have greater than a 48,000 pound loading on the tandem rear-axles thereof. However, some state regulations prevent vehicles having such a high axle loading, and, therefore, the vehicles are unable to be sold and operated in such states. Advantageously, the fire apparatus 10 of the present disclosure has a gross axle weight loading of at most 48,000 pounds on the tandem rear axles 18, and, therefore, the fire apparatus 10 may be sold and operated in any state of the United States.

Figure 8:
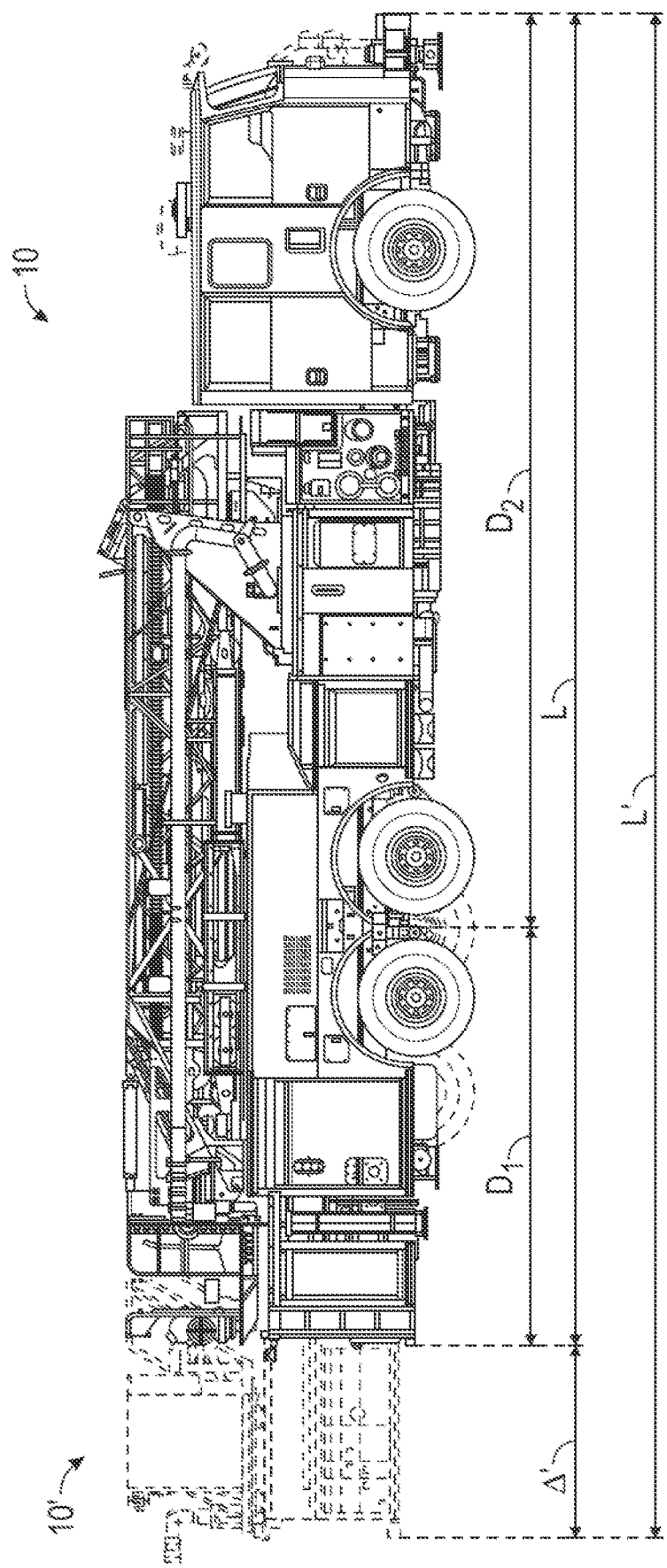
FIG. 8 is a side view of the mid-mount fire apparatus of FIG. 1 relative to a traditional mid-mount fire apparatus, according to an exemplary embodiment.
Figure 9:
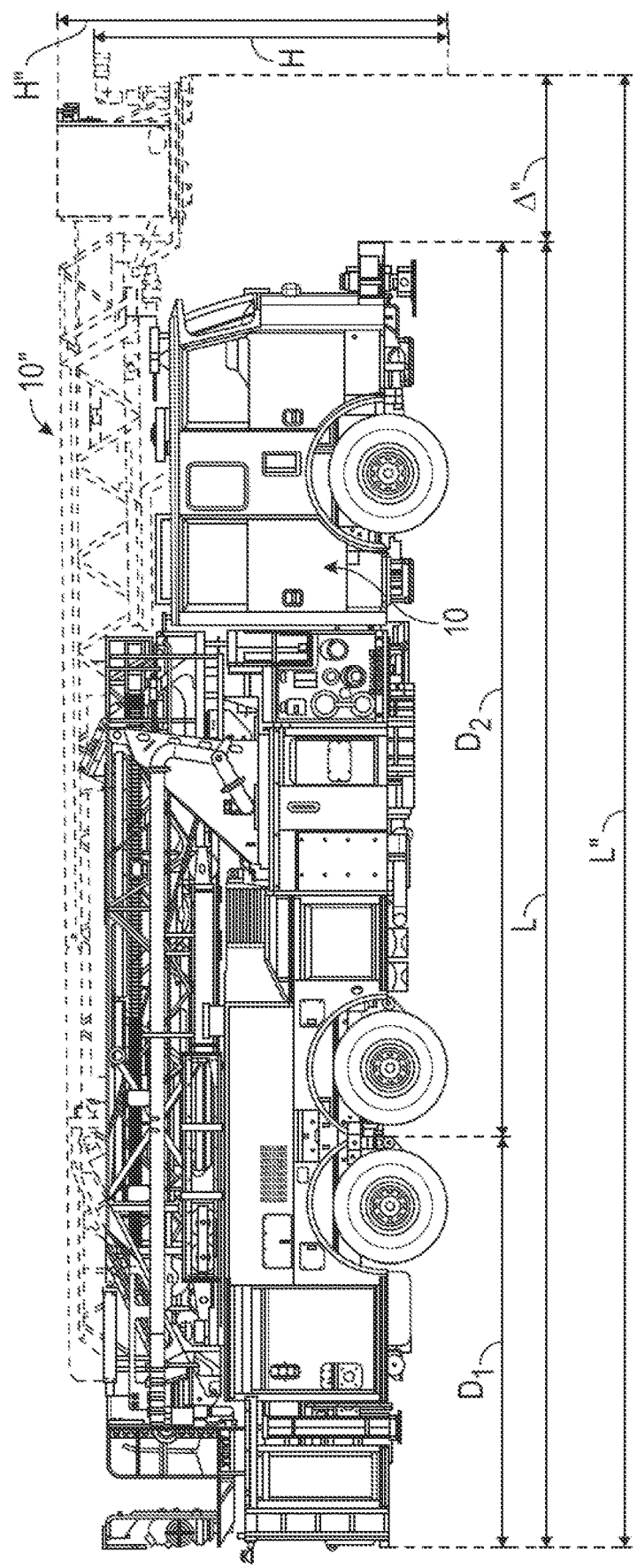
FIG. 9 is a side view of the mid-mount fire apparatus of FIG. 1 relative to a traditional rear-mount fire apparatus, according to an exemplary embodiment.

As shown in FIGS. 5 and 9, the fire apparatus 10 has a height H. According to an exemplary embodiment, the height H of the fire apparatus 10 is at most 128 inches (i.e., 10 feet, 8 inches). In other embodiments, the fire apparatus 10 has a height greater than 128 inches. As shown in FIGS. 8 and 9, the fire apparatus 10 has a longitudinal length L. According to an exemplary embodiment, the longitudinal length L of the fire apparatus 10 is at most 502 inches (i.e., 41 feet, 10 inches). In other embodiments, the fire apparatus 10 has a length L greater than 502 inches. As shown in FIGS. 8 and 9, the fire apparatus 10 has a distance $D_1$ between the rear end 4 of the body 110 and the middle of the tandem rear axles 18 (e.g., a body rear overhang portion, etc.). According to an exemplary embodiment, the distance $D_1$ of the fire apparatus 10 is at most 160 inches (i.e., 13 feet, 4 inches).

In other embodiments, the fire apparatus 10 has a distance $D_1$ greater than 160 inches. As shown in FIGS. 8 and 9, the fire apparatus 10 has a distance $D_2$ between the front end 2 of the front cabin 20 (excluding the front bumper 22) and the middle of the tandem rear axles 18. According to an exemplary embodiment, the distance $D_2$ of the fire apparatus 10 is approximately twice or at least twice that of the distance $D_1$ (e.g., approximately 321 inches, approximately 323 inches, at least 320 inches, etc.).

As shown in FIG. 8, the longitudinal length L of the fire apparatus 10 is compared to the longitudinal length L' of a traditional mid-mount fire apparatus 10'. As shown in FIG. 8, when the front axles of the fire apparatus 10 and the fire apparatus 10' are aligned, the fire apparatus 10' extends beyond the longitudinal length L of the fire apparatus 10 a distance Δ'. The distance Δ' may be approximately the same as the amount of the body 110 rearward of the tandem rear axles 18 of the fire apparatus 10 such that the amount of body rearward of the tandem rear axle of the fire apparatus 10' is approximately double that of the fire apparatus 10. Decreasing the amount of the body 110 rearward of the tandem rear axles 18 improves drivability and maneuverability, and substantially reduces the amount of damage that fire departments may inflict on public and/or private property throughout a year of operating their fire trucks.

One solution to reducing the overall length of a fire truck is to configure the fire truck as a rear-mount fire truck with the ladder assembly overhanging the front cabin (e.g., in order to provide a ladder assembly with comparable extension capabilities, etc.). As shown in FIG. 9, the longitudinal length L of the fire apparatus 10 is compared to the longitudinal length L' of a traditional rear-mount fire apparatus 10". As shown in FIG. 9, when the front axles of the fire apparatus 10 and the fire apparatus 10" are aligned, the ladder assembly of the fire apparatus 10" extends beyond the longitudinal length L of the fire apparatus 10 a distance Δ" such that the ladder assembly overhangs past the front cabin. Overhanging the ladder assembly reduces driver visibility, as well as rear-mount fire trucks do not provide as much freedom when arriving at a scene on where and how to position the truck, which typically requires the truck to be reversed into position to provide the desired amount of reach (e.g., which wastes valuable time, etc.). Further, the height H" of the fire apparatus 10" is required to be higher than the height H of the fire apparatus 10 (e.g., by approximately one foot, etc.) so that the ladder assembly of the fire apparatus 10" can clear the front cabin thereof.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is understood to convey that an element may be either X; Y; Z; X and Y; X and Z; Y and Z; or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the fire apparatus 10 and the systems and components thereof as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:
1. A mid-mount fire apparatus comprising:
a chassis;
a body assembly coupled to the chassis;
a front cabin coupled to the chassis forward of the body assembly;
a front axle coupled to the chassis;

a tandem rear axle coupled to the chassis; and
a ladder assembly having a proximal end that is coupled to the chassis rearward of the front cabin and between the front axle and the tandem rear axle, the ladder assembly including a plurality of ladder sections;
wherein the mid-mount fire apparatus has an overall length with (i) a first portion extending from a rear end of the body assembly to a middle of the tandem rear axle and (ii) a second portion extending from the middle of the tandem rear axle to a front end of the front cabin;
wherein the first portion is at most 160 inches, the second portion is at least 320 inches, and the overall length is at most 502 inches;
wherein the ladder assembly is extensible to a horizontal reach of at least 88 feet; and
wherein a distal end of the ladder assembly does not extend beyond the rear end of the body assembly when fully retracted.

2. The mid-mount fire apparatus of claim 1, wherein the ladder assembly includes a basket coupled to the plurality of ladder sections.

3. The mid-mount fire apparatus of claim 2, wherein the body assembly has first chamfered corners at the rear end thereof, and wherein the basket has second chamfered corners to correspond with the first chamfered corners of the body assembly.

4. The mid-mount fire apparatus of claim 3, wherein the body assembly includes a pair of ladders, each of the pair of ladders is coupled to a respective one of the first chamfered corners.

5. The mid-mount fire apparatus of claim 1, wherein the body assembly has a chamfered corner at the rear end thereof, and wherein the body assembly includes a ladder coupled to the chamfered corner.

6. The mid-mount fire apparatus of claim 5, wherein the ladder is selectively deployable from a stowed position and a deployed position.

7. The mid-mount fire apparatus of claim 6, wherein the ladder is hingedly coupled to the chamfered corner.

8. The mid-mount fire apparatus of claim 1, wherein the ladder assembly is extensible to a vertical reach of at least 95 feet.

9. The mid-mount fire apparatus of claim 1, wherein the mid-mount fire apparatus has an overall height of at most 128 inches when the ladder assembly is in a stowed position.

10. The mid-mount fire apparatus of claim 1, further comprising a pump positioned rearward of the front cabin and forward of an axis about which the ladder assembly rotates.

11. The mid-mount fire apparatus of claim 10, wherein the ladder assembly includes a work platform coupled to the proximal end, and wherein the work platform overhangs the pump when the ladder assembly is in a stowed position.

12. The mid-mount fire apparatus of claim 1, wherein the ladder assembly has at least a 1,000 pound tip load rating when the ladder assembly is fully extended without a basket coupled to the distal end thereof.

13. The mid-mount fire apparatus of claim 1, wherein the tandem rear axle has a gross axle weight rating of no more than 48,000 pounds.

14. The mid-mount fire apparatus of claim 1, further comprising a water tank, wherein the water tank has up to a 300 gallon capacity.

15. The mid-mount fire apparatus of claim 1, wherein the plurality of ladder sections include a base ladder section and a plurality of extensible ladder sections that extend relative to the base ladder section, wherein at least one of the plurality of extensible ladder sections is configured to over-retract past an end of the base ladder section when the ladder assembly is in a stowed position.

16. The mid-mount fire apparatus of claim 1, wherein the ladder assembly is extensible to a horizontal reach of 93 feet.

17. A mid-mount fire apparatus comprising:
a chassis;
a body assembly coupled to the chassis;
a front cabin coupled to the chassis forward of the body assembly;
a front axle coupled to the chassis;
a tandem rear axle coupled to the chassis; and
a ladder assembly including a base section and a plurality of extensible ladder sections, the base ladder section have a proximal end that is coupled to the chassis rearward of the front cabin and between the front axle and the tandem rear axle;
wherein the ladder assembly is extensible to a horizontal reach of at least 88 feet;
wherein at least one of the plurality of extensible ladder sections is configured to over-retract past the proximal end of the base ladder section when the ladder assembly is in a stowed position; and
wherein a distal end of the ladder assembly does not extend beyond a rear end of the body assembly when the ladder assembly is in the stowed position.

18. The mid-mount fire apparatus of claim 17, wherein the ladder assembly includes a basket coupled to a fly section of the plurality of extensible ladder sections.

19. The mid-mount fire apparatus of claim 17, wherein the ladder assembly is extensible to a horizontal reach of 93 feet.

20. A mid-mount fire apparatus comprising:
a chassis;
a body assembly coupled to the chassis;
a front cabin coupled to the chassis forward of the body assembly;
a front axle coupled to the chassis;
a tandem rear axle coupled to the chassis, the tandem rear axle having a gross axle weight rating of no more than 48,000 pounds; and
a ladder assembly including:
a base ladder section having a proximal end that is coupled to the chassis rearward of the front cabin and between the front axle and the tandem rear axle;
a plurality of extensible ladder sections including a fly section; and
a basket coupled to a distal end of the fly section;
wherein the ladder assembly is extensible to a horizontal reach of 93 feet;
wherein at least one of the plurality of extensible ladder sections is configured to over-retract past the proximal end of the base ladder section when the ladder assembly is in a stowed position; and
wherein the basket does not extend beyond a rear end of the body assembly when the ladder assembly is in the stowed position.

* * * * *